(12) United States Patent
Newville et al.

(10) Patent No.: US 12,295,493 B2
(45) Date of Patent: May 13, 2025

(54) DISPLAY MOUNTING SYSTEM WITH ADJUSTABLE WEIGHT COUNTERBALANCE

(71) Applicant: Manehu Product Alliance, LLC, Carlsbad, CA (US)

(72) Inventors: Brian Newville, San Diego, CA (US); Lee Marc, Cardiff by th Sea, CA (US)

(73) Assignee: Manehu Product Alliance, LLC, Carlsbad, CA (US)

( * ) Notice: Subject to any disclaimer, the term of this patent is extended or adjusted under 35 U.S.C. 154(b) by 0 days.

(21) Appl. No.: 17/876,950

(22) Filed: Jul. 29, 2022

(65) Prior Publication Data

US 2023/0016050 A1    Jan. 19, 2023

Related U.S. Application Data

(63) Continuation of application No. PCT/US2021/017141, filed on Feb. 8, 2021.

(60) Provisional application No. 62/971,974, filed on Feb. 8, 2020.

(51) Int. Cl.
*A47B 97/00* (2006.01)
*F16M 13/02* (2006.01)

(52) U.S. Cl.
CPC ......... *A47B 97/001* (2013.01); *F16M 13/022* (2013.01); *F16M 2200/041* (2013.01); *F16M 2200/063* (2013.01)

(58) Field of Classification Search
CPC ................. F16M 13/02; F16M 13/022; F16M 2200/041; F16M 2200/063; A47B 97/00; A47B 97/001

See application file for complete search history.

(56) References Cited

U.S. PATENT DOCUMENTS

| 2,090,439 | A | 8/1937 | George |
| 2,630,854 | A | 3/1953 | Paul |
| 4,076,351 | A | 2/1978 | Wyant |
| 4,082,244 | A | 4/1978 | Groff |

(Continued)

FOREIGN PATENT DOCUMENTS

| CA | 3073367 A1 | 3/2019 |
| CN | 100411567 C | 8/2008 |

(Continued)

OTHER PUBLICATIONS

ISA, International Search Report and Written Opinion, PCT Patent Application PCT/US2020/066196, mailed Apr. 9, 2021, 13 pages.

(Continued)

*Primary Examiner* — Monica E Millner
(74) *Attorney, Agent, or Firm* — Perkins Coie LLP

(57) ABSTRACT

A mounting system capable of mounting objects to support structures is disclosed. The mounting system includes a wall mount including a display bracket configured to hold the object, a fixed support bracket couplable to a vertical support structure, and a linkage assembly. The linkage assembly has a low-profile stowed configuration in which the object is held in a raised position close to the support structure. The linkage assembly moves to another configuration to move the object. The object can be held in a lowered position. A pinion adjustment mechanism can be used to control a biasing mechanism for facilitate convenient movement of the object.

18 Claims, 19 Drawing Sheets

(56) References Cited

U.S. PATENT DOCUMENTS

| | | | |
|---|---|---|---|
| 4,561,674 A | 12/1985 | Alessio | |
| 4,691,886 A | 9/1987 | Wendling et al. | |
| 4,852,500 A | 8/1989 | Ryburg et al. | |
| 5,037,054 A | 8/1991 | Mcconnell | |
| 5,101,736 A | 4/1992 | Bommarito et al. | |
| 5,108,063 A | 4/1992 | Koerber et al. | |
| 5,135,191 A | 8/1992 | Schmuhl | |
| 5,224,677 A | 7/1993 | Close | |
| 5,299,993 A | 4/1994 | Habing | |
| 5,437,235 A | 8/1995 | Randolph | |
| 5,499,956 A | 3/1996 | Habing et al. | |
| 5,560,501 A | 10/1996 | Rupert | |
| 5,738,316 A | 4/1998 | Sweere et al. | |
| 5,743,503 A | 4/1998 | Voeller et al. | |
| 5,826,846 A | 10/1998 | Buccieri et al. | |
| 5,842,672 A | 12/1998 | Sweere et al. | |
| 5,845,587 A | 12/1998 | Ditonto | |
| 5,857,756 A | 1/1999 | Fehre | |
| 5,876,008 A | 3/1999 | Sweere et al. | |
| 5,909,934 A | 6/1999 | Mcgraw | |
| 5,988,076 A | 11/1999 | Vander | |
| 6,065,725 A | 5/2000 | Mason | |
| 6,065,909 A | 5/2000 | Cook | |
| 6,105,909 A | 8/2000 | Wirth et al. | |
| 6,296,408 B1 | 10/2001 | Larkin et al. | |
| 6,419,196 B1 | 7/2002 | Sweere et al. | |
| 6,523,796 B2 | 2/2003 | Abramowsky et al. | |
| 6,592,090 B1 | 7/2003 | Li | |
| 6,695,274 B1 | 2/2004 | Chiu | |
| 6,712,008 B1 | 3/2004 | Habenicht et al. | |
| 6,889,404 B2 | 5/2005 | Lu et al. | |
| 6,905,101 B1 | 6/2005 | Dittmer | |
| 6,983,917 B2 | 1/2006 | Oddsen | |
| 7,014,157 B2 | 3/2006 | Oddsen | |
| 7,061,753 B2 | 6/2006 | Michoux et al. | |
| 7,252,277 B2 | 8/2007 | Sweere et al. | |
| 7,290,744 B2 | 11/2007 | Baldasari | |
| 7,300,029 B2 | 11/2007 | Petrick et al. | |
| 7,314,200 B2 | 1/2008 | Bally et al. | |
| 7,345,870 B2 | 3/2008 | Shin | |
| 7,395,996 B2 | 7/2008 | Dittmer | |
| 7,398,950 B2 | 7/2008 | Hung | |
| 7,448,584 B2 | 11/2008 | Chen et al. | |
| 7,494,099 B2 | 2/2009 | Shin | |
| 7,546,745 B2 | 6/2009 | Lee et al. | |
| 7,546,994 B2 | 6/2009 | Altonji et al. | |
| 7,640,866 B1 | 1/2010 | Schermerhorn | |
| 7,663,868 B1 | 2/2010 | Lam | |
| 7,721,658 B2 | 5/2010 | Seeley et al. | |
| 7,823,973 B2 | 11/2010 | Dragusin | |
| 7,854,415 B2 | 12/2010 | Holbrook et al. | |
| 7,866,622 B2 | 1/2011 | Dittmer | |
| 7,950,613 B2 | 5/2011 | Anderson et al. | |
| 8,006,440 B2 | 8/2011 | Thomas et al. | |
| 8,051,782 B2 | 11/2011 | Nethken et al. | |
| 8,074,950 B2 | 12/2011 | Clary | |
| 8,094,438 B2 | 1/2012 | Dittmer et al. | |
| 8,333,355 B2 | 12/2012 | Stifal et al. | |
| 8,382,052 B1 | 2/2013 | Mathieson et al. | |
| 8,724,037 B1 | 5/2014 | Massey | |
| 8,740,164 B2 | 6/2014 | Tachibana | |
| 8,746,635 B2 | 6/2014 | Kim et al. | |
| 8,783,193 B2 | 7/2014 | Scharing | |
| 8,864,092 B2 * | 10/2014 | Newville | F16M 13/02 361/679.01 |
| 8,893,628 B2 | 11/2014 | Mckenzie et al. | |
| 8,960,632 B2 | 2/2015 | Fallows | |
| 9,004,430 B2 | 4/2015 | Conner | |
| 9,016,648 B2 | 4/2015 | Smeenk | |
| 9,121,543 B2 | 9/2015 | Dittmer et al. | |
| 9,167,894 B2 | 10/2015 | Desroches et al. | |
| 9,265,346 B1 | 2/2016 | Forney | |
| 9,433,293 B2 | 9/2016 | Gross et al. | |
| 9,470,357 B2 | 10/2016 | Hazzard et al. | |
| 9,554,644 B2 | 1/2017 | Flaherty et al. | |
| 9,581,285 B2 | 2/2017 | Ergun et al. | |
| 9,625,091 B1 | 4/2017 | Massey | |
| 9,720,444 B2 | 8/2017 | Holden | |
| 9,876,984 B2 | 1/2018 | Massey | |
| 9,907,396 B1 | 3/2018 | Labrosse et al. | |
| 9,921,726 B1 | 3/2018 | Sculley et al. | |
| 9,999,557 B2 | 6/2018 | Diaz-Flores et al. | |
| 10,038,952 B2 | 7/2018 | Labrosse et al. | |
| 10,085,562 B1 | 10/2018 | Labrosse et al. | |
| 10,139,045 B1 | 11/2018 | Keuter | |
| 10,159,336 B2 | 12/2018 | Liao et al. | |
| 10,257,460 B2 | 4/2019 | Massey | |
| 10,277,860 B2 | 4/2019 | Massey | |
| 10,281,080 B1 | 5/2019 | Massey | |
| 10,285,297 B2 | 5/2019 | Bratcher et al. | |
| 10,376,158 B2 | 8/2019 | Desroches | |
| D879,514 S | 3/2020 | Goldberg et al. | |
| 10,659,279 B2 | 5/2020 | Chiu et al. | |
| 10,738,941 B2 | 8/2020 | Newville et al. | |
| 10,746,350 B2 * | 8/2020 | Pei | F16M 11/041 |
| D895,325 S | 9/2020 | Goldberg et al. | |
| 10,768,663 B2 | 9/2020 | Carson et al. | |
| 10,827,829 B1 | 11/2020 | Labrosse et al. | |
| 10,830,580 B2 | 11/2020 | Hodowany | |
| 10,859,201 B2 | 12/2020 | Newville | |
| 10,935,180 B1 | 3/2021 | Massey | |
| 10,980,339 B2 | 4/2021 | Game et al. | |
| 11,019,920 B2 | 6/2021 | Liao et al. | |
| 11,033,107 B2 | 6/2021 | Warren | |
| 11,051,611 B2 | 7/2021 | Goldberg et al. | |
| 11,077,547 B2 | 8/2021 | Gosselin | |
| 11,089,865 B2 | 8/2021 | Knapp et al. | |
| 11,178,354 B2 | 11/2021 | Massey | |
| 11,266,232 B2 | 3/2022 | Knapp et al. | |
| 11,284,713 B2 | 3/2022 | Hazzard et al. | |
| 11,287,080 B2 | 3/2022 | Newville et al. | |
| 11,297,940 B2 | 4/2022 | Horn et al. | |
| 11,346,493 B2 | 5/2022 | Massey | |
| 11,346,496 B2 | 5/2022 | Newville | |
| 11,357,323 B2 | 6/2022 | Nourse | |
| 11,460,145 B2 | 10/2022 | Massey | |
| 11,607,042 B1 | 3/2023 | Massey | |
| 11,668,434 B2 | 6/2023 | Newville et al. | |
| 11,692,666 B2 | 7/2023 | Patell | |
| 11,774,033 B2 | 10/2023 | Massey et al. | |
| 11,781,702 B2 | 10/2023 | Massey | |
| 11,781,703 B2 | 10/2023 | Massey | |
| 11,802,653 B2 | 10/2023 | Newville et al. | |
| 11,849,246 B1 | 12/2023 | Massey | |
| 11,856,317 B2 | 12/2023 | Massey | |
| 12,022,941 B2 | 7/2024 | Hazzard et al. | |
| 2002/0020329 A1 | 2/2002 | Kowalski | |
| 2002/0033436 A1 | 3/2002 | Peng et al. | |
| 2002/0043978 A1 | 4/2002 | Mcdonald | |
| 2002/0100851 A1 | 8/2002 | Abramowsky et al. | |
| 2002/0179791 A1 | 12/2002 | Kwon | |
| 2004/0084587 A1 | 5/2004 | Oddsen | |
| 2004/0164659 A1 * | 8/2004 | Bober | A47B 51/00 348/E5.128 |
| 2005/0010911 A1 | 1/2005 | Kim et al. | |
| 2005/0022699 A1 | 2/2005 | Goza | |
| 2005/0110911 A1 | 5/2005 | Childrey et al. | |
| 2005/0152102 A1 | 7/2005 | Shin | |
| 2005/0204645 A1 | 9/2005 | Bachinski et al. | |
| 2005/0217540 A1 | 10/2005 | Novak | |
| 2005/0236543 A1 | 10/2005 | Oneil | |
| 2006/0065166 A1 | 3/2006 | Chi et al. | |
| 2006/0070210 A1 | 4/2006 | Amdahl et al. | |
| 2006/0077622 A1 | 4/2006 | Keely et al. | |
| 2006/0102819 A1 | 5/2006 | Li | |
| 2006/0284037 A1 | 12/2006 | Dittmer et al. | |
| 2007/0007412 A1 | 1/2007 | Wang | |
| 2007/0007413 A1 | 1/2007 | Jung et al. | |
| 2007/0023599 A1 | 2/2007 | Fedewa | |
| 2007/0030405 A1 | 2/2007 | Childrey et al. | |
| 2007/0040084 A1 | 2/2007 | Sturman et al. | |
| 2007/0205340 A1 | 9/2007 | Jung | |
| 2007/0221807 A1 | 9/2007 | Park | |
| 2007/0252056 A1 | 11/2007 | Novin | |

(56) References Cited

U.S. PATENT DOCUMENTS

| | | |
|---|---|---|
| 2008/0078906 A1 | 4/2008 | Hung |
| 2008/0237424 A1 | 10/2008 | Clary |
| 2009/0032656 A1 | 2/2009 | Oh |
| 2009/0034178 A1 | 2/2009 | Le |
| 2009/0050757 A1 | 2/2009 | Oh et al. |
| 2009/0050763 A1 | 2/2009 | Dittmer |
| 2009/0108158 A1 | 4/2009 | Kim et al. |
| 2009/0166501 A1 | 7/2009 | Wang et al. |
| 2009/0179133 A1 | 7/2009 | Gan et al. |
| 2009/0206221 A1 | 8/2009 | Timm et al. |
| 2009/0212669 A1 | 8/2009 | Robert-reitman et al. |
| 2010/0006725 A1 | 1/2010 | Kim et al. |
| 2010/0024691 A1 | 2/2010 | Weber |
| 2010/0091438 A1 | 4/2010 | Dittmer |
| 2010/0123059 A1 | 5/2010 | Saez |
| 2010/0149736 A1 | 6/2010 | Dittmer et al. |
| 2010/0155558 A1 | 6/2010 | Zhang et al. |
| 2010/0171013 A1 | 7/2010 | Anderson et al. |
| 2010/0207006 A1 | 8/2010 | Kim |
| 2011/0043978 A1 | 2/2011 | Bremmon et al. |
| 2011/0108688 A1 | 5/2011 | Parruck |
| 2011/0198460 A1 | 8/2011 | Stifal et al. |
| 2011/0234926 A1 | 9/2011 | Smith |
| 2012/0032062 A1 | 2/2012 | Newville |
| 2012/0033371 A1 | 2/2012 | Pankros et al. |
| 2012/0061543 A1 | 3/2012 | Juan |
| 2012/0167486 A1 | 7/2012 | Lee |
| 2013/0032682 A1* | 2/2013 | Bell .............. F16M 11/2085 248/277.1 |
| 2013/0082156 A1 | 4/2013 | Conner |
| 2013/0176667 A1 | 7/2013 | Kulkarni et al. |
| 2013/0187019 A1 | 7/2013 | Dittmer et al. |
| 2013/0199420 A1 | 8/2013 | Hjelm |
| 2013/0221174 A1 | 8/2013 | Sapper et al. |
| 2013/0320163 A1 | 12/2013 | Wong |
| 2014/0208985 A1 | 7/2014 | Desroches et al. |
| 2014/0211100 A1 | 7/2014 | Massey |
| 2014/0311050 A1 | 10/2014 | Kincaid et al. |
| 2015/0138304 A1 | 5/2015 | Mcardell et al. |
| 2015/0245707 A1 | 9/2015 | Saab |
| 2015/0277214 A1 | 10/2015 | Schuh |
| 2016/0120309 A1 | 5/2016 | Brandt et al. |
| 2016/0270528 A1 | 9/2016 | Scharing |
| 2017/0105529 A1 | 4/2017 | Kozlowski et al. |
| 2017/0143117 A1 | 5/2017 | Koulizakis |
| 2018/0054156 A1 | 2/2018 | Lokey |
| 2018/0131895 A1 | 5/2018 | Massey |
| 2018/0310459 A1 | 11/2018 | Blunier |
| 2018/0352189 A1 | 12/2018 | Massey |
| 2019/0029414 A1 | 1/2019 | Nourse et al. |
| 2019/0059574 A1 | 2/2019 | Paul et al. |
| 2019/0072231 A1 | 3/2019 | Newville et al. |
| 2019/0309895 A1 | 10/2019 | Newville |
| 2019/0335135 A1 | 10/2019 | Massey |
| 2019/0343272 A1 | 11/2019 | Smith et al. |
| 2019/0374025 A1 | 12/2019 | Bowman |
| 2020/0022492 A1 | 1/2020 | Patrick et al. |
| 2020/0049304 A1 | 2/2020 | Hung |
| 2020/0355319 A1 | 11/2020 | Newville et al. |
| 2020/0390009 A1 | 12/2020 | Whitehead et al. |
| 2020/0408353 A1 | 12/2020 | Massey |
| 2021/0088177 A1* | 3/2021 | Massey .............. F16M 11/24 |
| 2021/0190259 A1 | 6/2021 | Newville |
| 2022/0150441 A1 | 5/2022 | Massey |
| 2022/0178493 A1 | 6/2022 | Seol et al. |
| 2022/0252209 A1 | 8/2022 | Newville |
| 2023/0016050 A1 | 1/2023 | Newville et al. |
| 2023/0016449 A1 | 1/2023 | Newville et al. |
| 2024/0027020 A1 | 1/2024 | Newville et al. |
| 2024/0125425 A1 | 4/2024 | Newville et al. |

FOREIGN PATENT DOCUMENTS

| | | |
|---|---|---|
| CN | 103371623 A | 10/2013 |
| CN | 104424849 A | 3/2015 |
| CN | 109605346 A | 4/2019 |
| CN | 111031859 A | 4/2020 |
| CN | 109605346 B | 8/2020 |
| EP | 3662786 A1 | 6/2020 |
| GB | 2222939 A | 3/1990 |
| GB | 2579974 A | 7/2020 |
| JP | 2009014047 A | 1/2009 |
| KR | 100705069 B1 | 4/2007 |
| KR | 20070081731 A | 8/2007 |
| WO | 2019043670 A1 | 3/2019 |
| WO | 2019183822 A1 | 10/2019 |
| WO | 2021006987 A1 | 1/2021 |
| WO | 2021127552 A1 | 6/2021 |

OTHER PUBLICATIONS

ISA, International Search Report and Written Opinion, PCT Patent Application PCT/US2021/017141, mailed Jun. 1, 2021, 11 pages.

ISA, International Search Report and Written Opinion, PCT Patent Application PCT/US2021/017492, mailed Jun. 3, 2021, 17 pages.

ISA, International Preliminary Report on Patentability for International Application No. PCT/IB2018/57591. Mail Date: Mar. 10, 2020, 7 pages.

ISA, International Search Report and Written Opinion for International Application No. PCT/IB2018/57591. Mail Date: Jan. 28, 2019, 8 pages.

MantelMount MM750 Pro Above Fireplace Pull Down TV Mount, accessed Dec. 3, 2020 from https://www.mantelmount.com/products/mm750-pro-pull-down-tv-mount, 6 pages.

MantelMount RB100 Recess Box—MantelMount Pull Down TV Mount Accessory, accessed Dec. 3, 2020 from https://www.mantelmount.com/products/mantelmount-rb100-recess-box, 6 pages.

Patent Trial and Appeal Board of the United States Patent and Trademark Office, Petition for Post Grant Review of U.S. Pat. No. 11,781,703, *Lumi Legend Corporation* (Petitioner) v. *Manehu Product Alliance, LLC* (Patent Owner), Filed: Jan. 24, 2024, 172 pages.

* cited by examiner

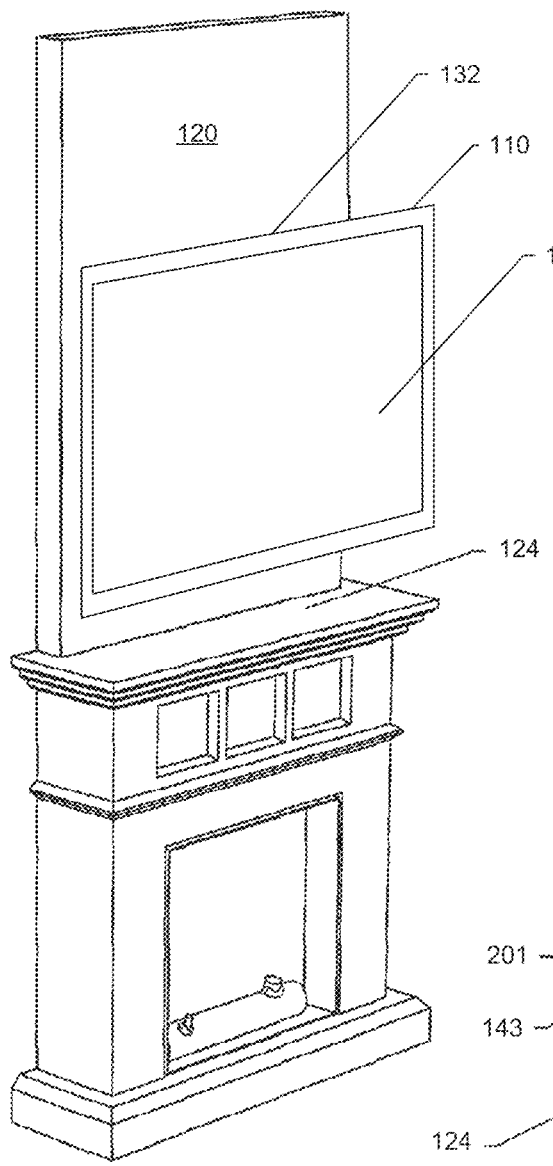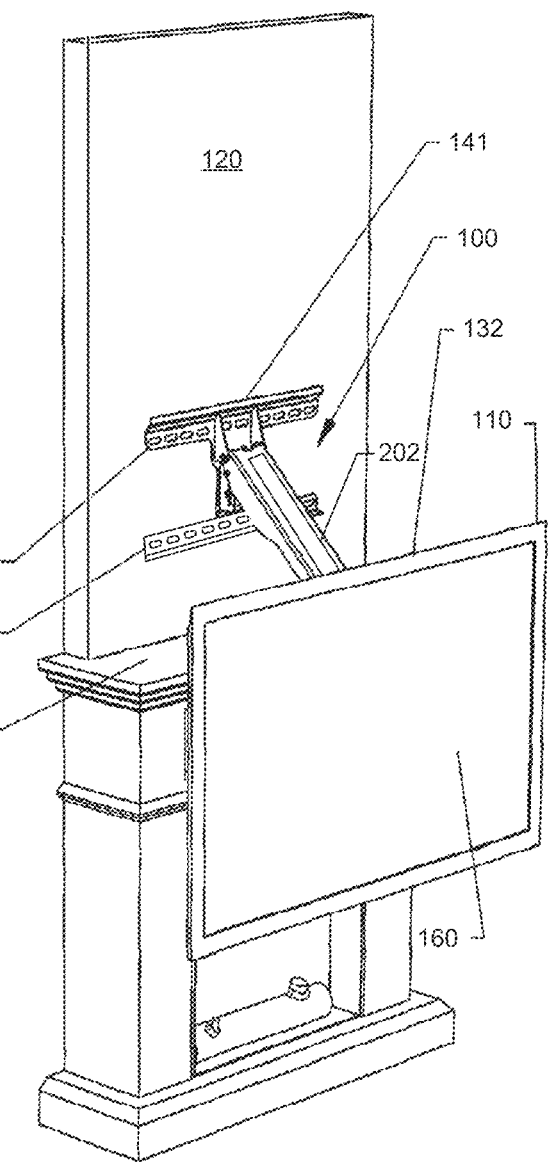
FIG. 1
FIG. 2

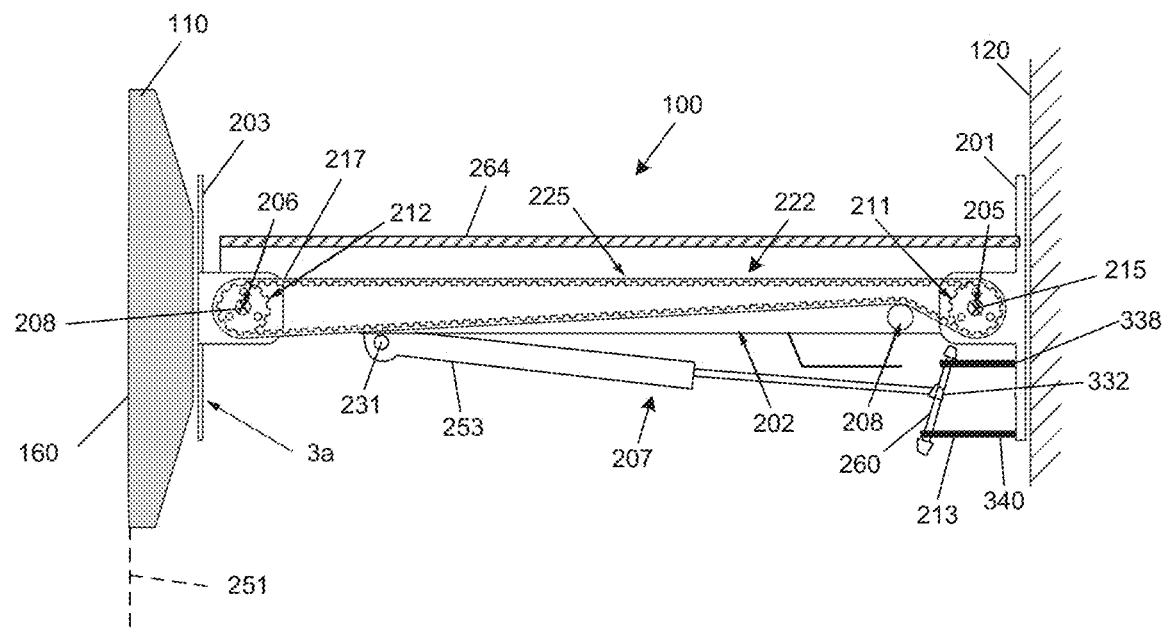
FIG. 3
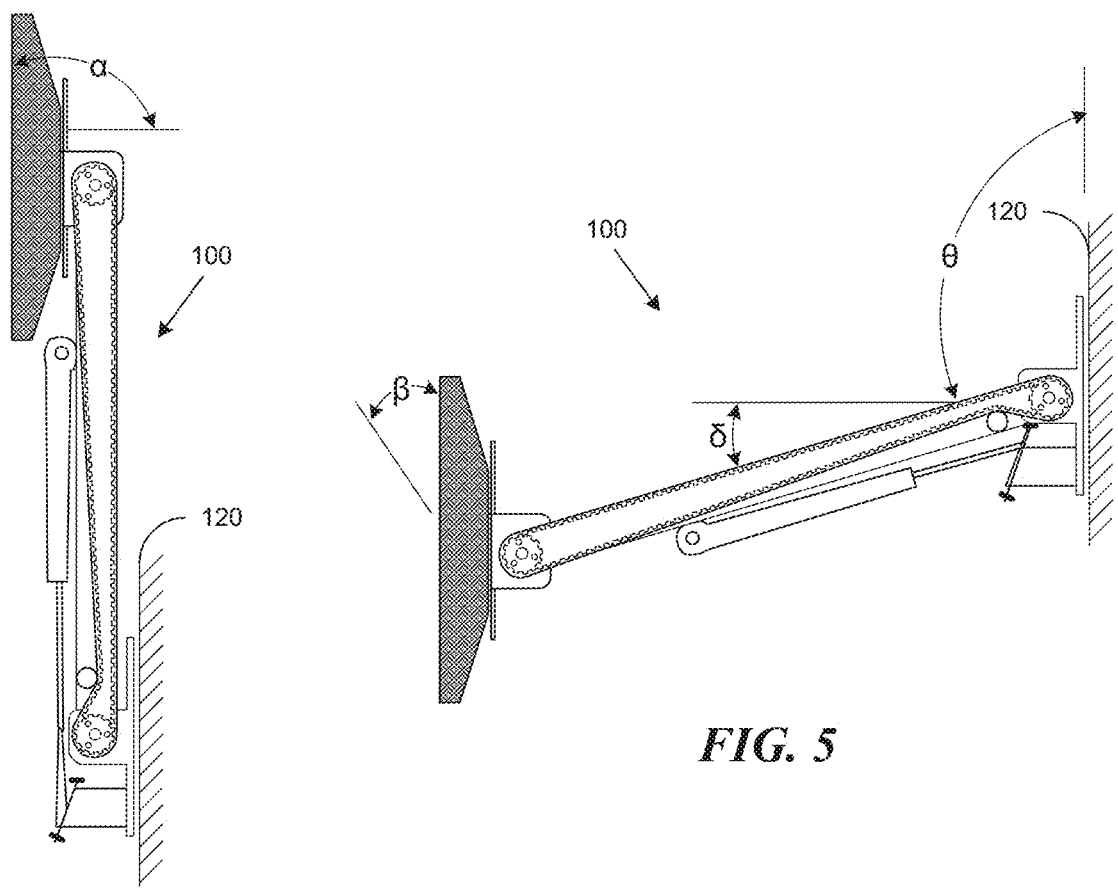
FIG. 5
FIG. 4

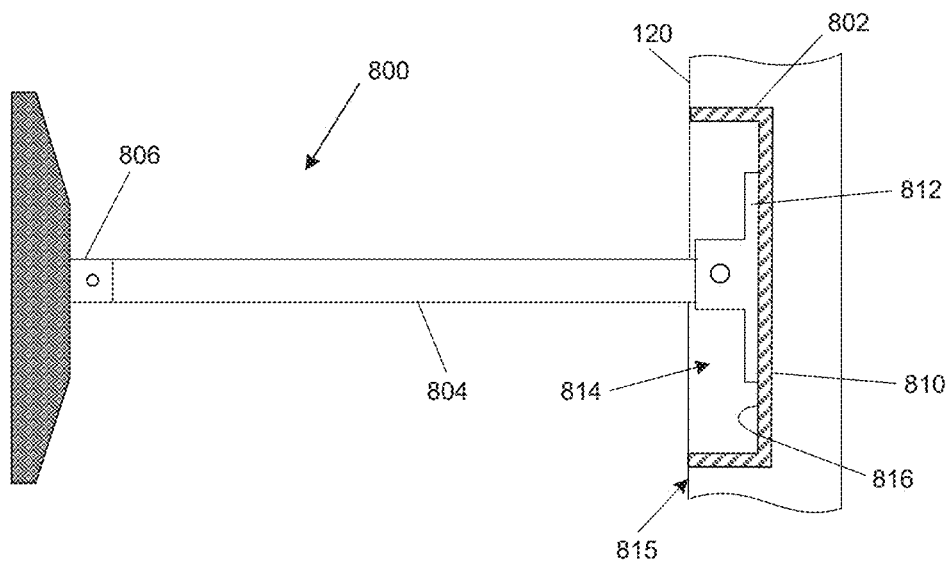
*FIG. 32*
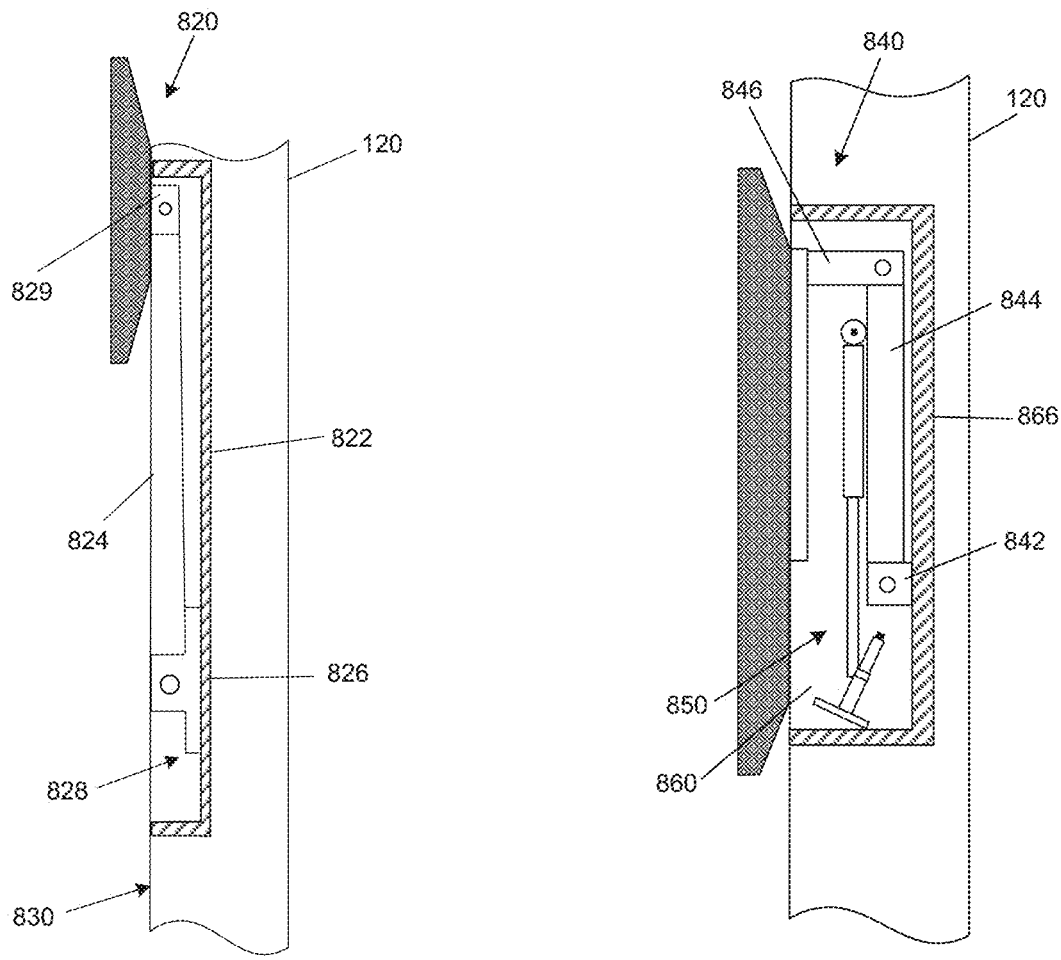
*FIG. 33*
*FIG. 34*

DISPLAY MOUNTING SYSTEM WITH ADJUSTABLE WEIGHT COUNTERBALANCE

CROSS-REFERENCE TO RELATED APPLICATIONS

The present application is a continuation of International Application No. PCT/US21/17141, filed Feb. 8, 2021, and claims the benefit under 35 U.S.C. § 119(e) of U.S. Provisional Patent Application No. 62/971,974, filed Feb. 8, 2020, which are each incorporated herein by reference in their entireties.

TECHNICAL FIELD

The present invention relates generally to mounting systems. More specifically, the invention relates to display mounting systems for mounting displays to structures.

BACKGROUND

Televisions are often mounted directly to walls using wall mounts. Tilting wall mounts and full motion wall mounts are two types of mounts that allow movement of the television. Tilting wall mounts often allow tilting about a horizontal axis of rotation. Unfortunately, if tilting wall mounts are installed at relatively high locations, there may be limited viewing because ideal viewing often requires that the center of the screen be level with a viewer's eyes. Full motion wall mounts often allow movement of the television away from walls, swiveling of the television, and/or tilting of the television. If either a tilting wall mount or a full motion wall mount is installed above a fireplace, the mounted television is often much higher than a sitting viewer's eyes and, thus, may not provide comfortable viewing.

SUMMARY

At least some embodiments are directed to mounts capable of holding and moving objects. Mounted objects can be held at relatively high locations to keep the objects out of the way when stowed. Mounted objects can be conveniently moved to a desired position. The mounts can include adjustable counterbalancing mechanisms configured to counterbalance the mounted objects.

In certain embodiments, a wall mount can hold an electronic display in the form of a television. The wall mount can be installed above a fireplace or other aesthetically pleasing location. A user can manually or automatically lower the television such that the television is generally in front of the fireplace. A viewer's eyes can be generally level with the center of the screen. The television can be panned, tilted (e.g., rotated about a generally horizontal axis), and/or swiveled (e.g., rotated about a generally vertical axis) to accommodate different viewing positions. Pivots, swivels (e.g., swivel brackets), joints, or the like can be used to provide the desired motion. The television can range in weight from, for example, about 20 pounds to about 110 pounds.

In some embodiments, a wall mount includes a low-profile parallel mechanism in the form of a four-bar linkage configured to store an object at a raised, low profile position close to the wall (e.g., within 5 inches of the wall). The mounted object can be moved away from the raised position along a path (e.g., an arcuate path, partially circular path, curved path, partially elliptical path, or the like). The four-bar linkage can include a fixed linkage that connects to a main load bearing linkage through a pivot, which connects to an object mounting linkage through a pivot, which connects to an adjustable length linkage through a pivot, which connects back to the fixed linkage through a pivot. In certain embodiments, the fixed linkage is a support bracket, and the object mounting linkage is a display bracket. The wall mount can include a rack and pinion adjustment mechanism, linear gear/spur gear adjustment mechanism, motorized adjustment mechanism, linear slides, belt-drive rail actuators, threaded rod linear actuators, etc.

In some embodiments, a mounting system includes a television bracket, a fixed support bracket, and an arm pivotably coupled to the television bracket and the fixed support bracket. The arm pivots relative to the television bracket and the fixed support bracket when the television bracket is moved from a raised position for holding a television above a fireplace to a lowered position for holding the television in front of the fireplace. The mounting system includes a counterbalance mechanism having at least one compression component with a first end coupled to the arm and a second end opposite the first end. An adjustment mechanism is coupled to the fixed support bracket. The adjustment mechanism has a rack and a pinion carriage pivotably coupled to the second end of the at least one compression component. The carriage is configured to travel along the rack to adjust counterbalancing. For example, the carriage can be translated to move the first end and/or second end between a first position for providing a first counterbalancing force and a second position for providing a second counterbalancing force different from the first counterbalancing force. The carriage can be moved anywhere along the rack desired counterbalancing.

In some embodiments, a mounting system includes a display bracket, a fixed support bracket, and a support arm rotatably coupled to the fixed support bracket. The mounting system can include a counterbalance mechanism that cooperates with the support arm to allow a user to vertically move the display. The counterbalance mechanism includes a piston configured to provide a counterbalance force and a force adjustment mechanism operable to adjust the counterbalance force. The force adjustment mechanism includes a rack with a plurality of teeth and a pinion assembly rotatably coupled to the piston such that the piston extends and/or contracts as the pinion assembly moves along the rack.

In some further embodiments, a television mount includes a biasing mechanism configured to counterbalance the weight of the television. The biasing mechanism includes a force balancing device and a force adjustment mechanism. The force adjustment mechanism includes a rack having a plurality of teeth and a carriage. The carriage can be rotatably coupled to the force balancing device and engages the rack (e.g., a sloped gear rack, vertical gear rack, etc.). The carriage can include a pinion assembly positioned to engage the teeth of the sloped rack. The force balancing device can rotate relative to the carriage when the carriage moves along the rack. The carriage can be selectively fixed to the rack.

In some embodiments, a mounting system includes a television holding assembly and a counterbalance mechanism configured to allow a user to move a television carried by the television holding assembly from a raised position to a lowered position. The counterbalance mechanism includes at least one piston and a force adjustment mechanism. The force adjustment mechanism is coupled to the piston such that the piston is movable along the rack when the force adjustment mechanism is unlocked and translationally fixed to the rack when the force adjustment mechanism is locked.

The force adjustment mechanism can include a carriage configured to releasably grip the rack. The carriage can grip a rail, guide, track or other portion of the rack. The carriage can include a body that enmeshes teeth of gears, thereby locking the gears together. The locked gears can enmesh teeth of the rack, thereby translationally fixing the carriage to the rack. The force adjustment mechanism can include a pinion assembly configured to translate along a row of gear teeth of the rack in an incremental manner and releasably coupled an end of the at least one piston to the rack.

The television holding assembly can include a bracket configured to hold a display in a raised position and a lowered position, a fixed support bracket, and a support arm rotatably coupled to the fixed support bracket. In some embodiments, the television holding assembly has an arm, swing arm, linkage (e.g., four-bar linkage, five-bar linkage, etc.), or other articulating assembly.

In some embodiments, a television mounting device includes a mounting bracket, a television bracket, and an arm. The mounting bracket can be configured to be mounted on a wall. The television bracket is configured to hold a television. The arm has a first end rotatably coupled to the mounting bracket and a second end rotatably coupled to the television bracket. The television mounting device further includes an indexed drive assembly configured to provide target positioning of the television bracket when the arm is moved between different positions. In some embodiments, the indexed drive assembly is coupled to the television bracket and positions the television bracket at a targeted position when the arm is moved between a first position (e.g., a raised position) and a second position (e.g., a lowered position). In manually operated embodiments, a user can pull or push the television bracket to a target height. In motorized embodiments, the television mounting device can include one or more motors that operate to position the television bracket at the target height.

The indexed drive assembly can be configured to cause a television bracket to be positioned below at least a portion of the mounting bracket when the arm is at the lowered position. The drive assembly can include a plurality of indexers that cooperate to define predetermined positions relative to a reference component or point. The indexers can be connected by one or more idle gears, flexible connectors, worm gears, rack and pinion assemblies, or other drive assemblies. In some embodiments, the indexers are enmeshed with a flexible connector so as to define the target positioning. The drive assembly can rotationally fix a television bracket to the mounting bracket or other stationary component mounted to the wall. The mounting bracket can be mounted on an exterior of the wall, embedded in the wall, or completely hidden within the wall. In some embodiments, the drive assembly rotationally fixes the television bracket to a stationary component to hold the television when the arm moved.

The drive assembly can move the television bracket to preset positions and includes a first indexer connected to the mounting bracket, a second indexer connected to the television bracket, and a flexible member engaging the first and second indexers to synchronize (1) rotation of the television bracket relative to the arm with (2) rotation of the arm relative to the mounting bracket. Advantageously, the positioning allows a user to move the television bracket to preset positions without having to recalibrate the television mounting device. The first indexer can be rotationally and translationally fixed to the mounting bracket. The second indexer can be rotationally and translationally fixed to the television bracket. The flexible member can maintain the rotational relationship between the first and second indexers during use. In some embodiments, the flexible member is a drive belt.

In motorized television mounting devices, the drive assembly can include a first motor, a second motor, and a controller. The controller can be programmed to command the first and second motors to coordinate motion between components, such as motion of the arm and motion of the television mounting bracket. The controller can be programmed with indexing, indexing maps, and other data for operating the motors to provide controlled movement of components. The first motor can be coupled to the arm and engage a first gear coupled to the television bracket. The second motor can engage a second gear coupled to the mounting bracket. The controller can communicate wirelessly or via a wired connection with the first and second motors. The first and second motors can be coupled to a power supply, such as a battery, an AC outlet, or another power source.

In some embodiments, a television mounting device includes a mounting bracket, a television bracket, an arm, and a drive assembly. The arm is rotatably coupled to the mounting bracket and rotatably coupled to the television bracket. The drive assembly is rotationally fixed to the television bracket and configured to cause rotation of the television bracket relative to the arm when the arm is moved between positions. The drive assembly can include at least one indexer, gear, sprocket, indexing element, or other discrete positioning element fixed to the television bracket. The drive assembly can hold the television bracket rotationally fixed (e.g., via a non-rotatable connection) relative to a stationary indexer such that movement of the arm relative to the stationary indexer causes the drive element to rotationally hold the television bracket throughout at least a portion of the television mounting device reconfiguration. In certain embodiments, the television bracket can be held at a tilt position when the television bracket is moved between a raised position and a lowered position. In other embodiments, the television bracket can be rotated between predetermined positions when moved vertically. The drive assembly can gradually rotate the television bracket based on the geometry of the television mounting device. For example, the television bracket can gradually be moved from a first tilt position to a second tilt position as the television bracket is lowered, thereby allowing the television bracket to position the television at target viewed heights for different lines of sight.

In some further embodiments, a display mounting device includes a mounting bracket, a display bracket, and an arm. The mounting bracket can be configured to be mounted on a wall. The display bracket is configured to hold a display. The display mounting device further includes a tilt orienting assembly configured to provide target positioning of the display bracket when the arm is moved between different positions. The tilt orienting assembly can include one or more indexers, connectors, and torque balancing elements. In some embodiments, the tilt orienting assembly operates as a moment countering drive for applying torques. In some embodiments, the tilt orienting assembly is coupled to the display bracket and positions the display bracket at a targeted position when the arm is moved between a first position (e.g., a raised position) and a second position (e.g., a lowered position).

In some embodiments, a system includes a display bracket configured to hold a television, a support bracket, and an arm (e.g., a one-piece arm, a multi-piece arm, etc.) or linkage assembly rotatably coupled to the display bracket and the support bracket. In swing-arm embodiments, the arm can have two pivots or axes of rotation at opposing ends. The system can be configured to operate as a two-bar linkage, three-bar linkage, or other linkage mechanism. In linkage systems, the linkage assembly has a collapsed upright configuration for holding the display bracket at the raised position and an expanded configuration for holding the display bracket at the lowered position. In some embodiments, the system can include a motorized actuator operable to cause the linkage assembly to raise and lower the display bracket. The system can include a motorized swivel operable to swivel the television.

In some further embodiments, a motorized television system includes a television holder assembly configured to hold a television, a mounting assembly, and an arm assembly. The arm assembly includes an arm pivotally coupled to the television holder assembly and the mounting assembly. The arm assembly is operable to move the television holder assembly between a raised position and a lowered position. At least a portion of the television holder assembly is lower than the mounting assembly when the television holder assembly is at the lowered position. In some embodiments, the mounting system includes a swivel mechanism that swivels a television relative to the arm assembly.

In yet further embodiments, a system includes a low-profile wall mount including a display bracket configured to carry a television a support bracket configured to couple to a wall, and a linkage or arm assembly rotatably coupled to the display bracket and rotatably coupled to the support bracket. The system further includes a biasing mechanism configured to counterbalance the weight of large television screens. The biasing mechanism includes a force balancing device and a force adjusting mechanism. The force adjusting mechanism is operable to change the configuration of the force balancing device to increase or decrease a balancing force to counterbalance weights of different televisions. The force adjustment mechanism can include at least one threaded member, carriage, slider, force adjuster, etc. The threaded member can be rotated to drive the carriage so as to contract or extend the biasing mechanism (e.g., gas spring, piston, etc.) when the carriage moves along the threaded member.

In some embodiments, a device comprises a wall mounting portion, an extending portion, and a television mounting portion. The wall mounting portion is coupled to the extending portion. The extending portion is rotatably attached to the television mounting portion and positions a television portion down and away from the wall mounting portion (e.g., an extended configuration). The extending portion positions a television mounting portion up and towards the wall mounting portion (e.g., a retracted configuration). The extending portion comprises an arm, at least one gas spring, a spring block, a calibration screw, an adjustment screw, and an adjustment collar. The spring block moves vertically when the calibration screw rotates such that the one gas spring is connected a spring block so as to provide adjustment. In some embodiments, the adjustment screw directly engages and moves into contact with the arm. The television mounting portion comprises a handle with a temperature element (e.g., temperature sensor, gauge, etc.).

In some embodiments, a television mounting device includes a television holder and an arm. The arm has a first end rotatably couplable to a support structure and a second end rotatably coupled to the television holder. The television mounting device further includes a rotational locking assembly configured to provide target positioning of the television holder when the arm is moved between different positions. In some embodiments, the rotational locking assembly is coupled to the television holder (e.g., a television bracket) and positions the television holder at a targeted position when the arm is moved between a first position (e.g., a raised position) and a second position (e.g., a lowered position).

In some embodiments, a television mounting device includes a mounting bracket, a television bracket, and an arm. The mounting bracket can be configured to be mounted on a wall. The television bracket is configured to hold a television. The arm has a first end rotatably coupled to the mounting bracket and a second end rotatably coupled to the television bracket. The television mounting device further includes a means for positioning of the television bracket when the arm is moved between different positions. In some embodiments, the means for positioning is coupled to the television bracket and positions the television bracket at a targeted position when the arm is moved between a first position (e.g., a raised position) and a second position (e.g., a lowered position). In manually operated embodiments, a user can pull or push the television bracket to a target height. In motorized embodiments, the television mounting device can include one or more motors that operate to position the television bracket at the target height. The means for positioning can include one or more indexed drive assemblies, tilt drive assemblies, tilt orienting assembly, or the like.

BRIEF DESCRIPTION OF THE DRAWINGS

FIG. 1 is a pictorial view of a television installed above a fireplace.

FIG. 2 shows the television of FIG. 1 in a lowered position in front of the fireplace.

FIG. 3 is a side view of a manually operated television mounting device of FIG. 1 with an arm in a horizontal position in accordance with an embodiment of the technology.

FIG. 4 shows the television mounting device in a raised position adjacent to a wall.

FIG. 5 shows the television mounting device in a lowered position.

FIG. 32 is a side view of a partially recessed television mounting device in accordance with embodiments of the technology.

FIGS. 33 and 34 are side views of recessed television mounting devices in raised positions in accordance with embodiments of technology.

DETAILED DESCRIPTION

Overview

Figure 6:
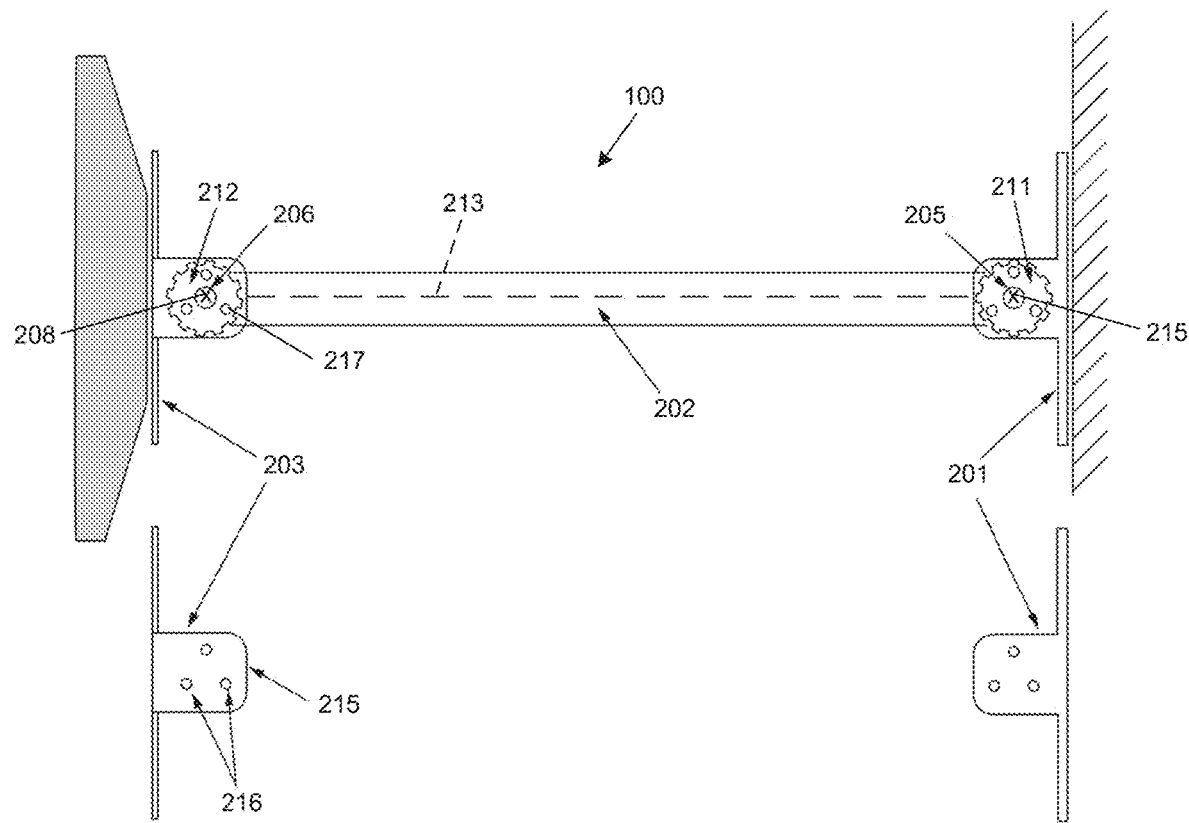
FIG. 6 is a side view of components of the television mounting device and brackets.

FIG. 1 shows a display or television 110 ("television 110") in a raised, stowed position and very close to a wall 120. FIG. 2 shows the television 110 in a lowered, deployed position and in front of the fireplace. Referring now to FIG. 1, the stowed television 110 is positioned above a fireplace to avoid occupying usable space and to reduce the likelihood of unwanted inadvertent contact by people moving about the room. If the fireplace includes a hearth, it may be difficult for small children, or other individuals, to inadvertently contact the television 110. The television 110 can be generally flat against or parallel to the wall 120 (e.g., parallel to the wall 120) to minimize or limit unwanted reflections from a screen 160 that may be directed to someone sitting on furniture in front of the television 110, especially when the television 110 is turned off. The raised television 110 can swing downwardly and, if desired, can be positioned in front of the fireplace, as shown in FIG. 2. A television mounting device 100 ("mounting device 100"), which is visible in FIG. 2, can be hidden from view of someone in front of the television 110 for an aesthetically pleasing appearance. The lowered television 110 is especially well suited for viewing when someone is positioned near the television 110, for example, to play a game system (e.g., Xbox 360, PlayStation®, PlayStation®2, PlayStation 3, Nintendo game system, or the like), or to provide convenient viewing while sitting, for example, on furniture or on the floor. After viewing, the television 110 can be returned to the stowed position.

Referring now to FIG. 2, a top 132 of the stowed television 110 can be lower than most or all of a mounting bracket 201, and the screen 160 can be substantially perpendicular to a sitting viewer's line of sight, substantially parallel to a front surface of the wall 120, or at another desired orientation. For example, the top 132 of the lowered television 110 can be lower than a top 141 and/or a bottom 143 of the mounting bracket 201. The mounting device 100 can automatically move (e.g., raise/lower, swivel, and/or tilt) the television 110. As the television 110 is lowered, the mounting device 100 can automatically rotate the television 110 relative to an arm 202 to keep the screen 160, for example, substantially perpendicular relative to the viewer's line of sight, substantially parallel to the wall 120, etc. Once the television 110 is at a desired position, the television 110 can be further tilted, swiveled, panned, etc.

In some motorized embodiments, the mounting device 100 can include motorized swivel mechanisms, swivel/tilting mechanisms, drive motors, or the like to provide motorized positioning and can include one or more controllers, such as the controller discussed in connection with FIG. 29. The positioning capabilities of the mounting device 100 can be selected based on target viewing positions.

In some manually operated embodiments, a user can conveniently grasp and pull the television 110 away from the wall 120. The bottom of the television 110 can automatically swing away from the wall 120 to keep the television 110 from striking the top of a mantel 124. After the bottom of the television 110 has moved forwardly past the mantel 124, the television 110 can be lowered downwardly past the top surface of the mantel 124. In this manner, the television 110 can be brought down and in front of the mantel 124 or any other protruding object below the mounting bracket 201. One or more adjustable fixed stops can be used to prevent contact with the mantel 124 or to achieve repeatable positioning, or both. The fixed stops can be incorporated into the arm 202 (e.g., swing arm, linkage assembly, four-bar linkage, five-bar linkage, etc.), mounting bracket 201, or any other components of the mounting device 100. The mounting device 100 can include one or more counterbalancing mechanisms (e.g., drive trains, pulley systems, gear systems, motors, indexers, sprockets, belts, chains, or combinations thereof. Example counterbalancing mechanisms are discussed in connection with FIGS. 3-5 and 9-19 and can be adjusted by rotating threaded members, moving carriage, positioning pinions (e.g., pinion carriages, pinion assemblies, etc.), or the like.

The mounting device 100 can be coupled to a wide range of different types of support structures, such as walls of a dwelling (e.g., a house, an apartment, etc.), an office, a lobby, a bar (e.g., sports bar), restaurant, or the like and can be mounted to vertical walls or non-vertical walls, including, without limitation, angled walls, non-planar walls, or other structures sturdy enough to handle the load of the mounting device 100 and any attached object(s). The mounting bracket 201 can be configured to be mounted to a surface of the wall. In some embodiments, the mounting bracket 201 can be configured to be positioned at least partially within the wall. For example, the mounting bracket 201 can be mounted to the sides of studs or other structural elements within or inset in the wall. At least a portion of the arm 202 can be positioned within the wall 120 and surrounded by the recessed mounting bracket 201. In some embodiments, the entire mounting bracket 201 is positioned within the wall 120. The arm 202 can include a first end 215 rotatably coupled to the mounting bracket 201 and an opposing second end 217 rotationally coupled to a display or television bracket 203 ("television bracket 203"). The configuration, dimensions, and functionality of the mounting bracket 201, the arm 202, and the mounting bracket 201 can be selected based on the desired installation location, paths of travel of the television 110, a range of motion of the television 110, or the like. Example mounting arrangements and positioning of mounting device 100 are discussed in connection with FIGS. 32-34.

The television 110 can be, without limitation, a liquid crystal display (LCD) television, a plasma television, a light emitting diode (LED) television, or other type of flat-screen television, as well as other types of wall-mountable televisions. The weights of such televisions are often in a range of about 20 pounds to about 110 pounds and often have a maximum thickness less than about 5 inches. Advantageously, large screen televisions have a screen with a length (measured diagonally) equal to or greater than about 30 inches, 50 inches, 60 inches, 70 inches, 80 inches, etc., and can hide the entire mounting device 100, as shown in FIG. 2. The mounting device 100 can also hold small or medium screen televisions. Other types of electronic displays (e.g., monitors) or objects can be carried by the mounting device 100. Exemplary mountable objects include, but are not limited to, screens suitable for use with front projectors, boards (e.g., a chalk board, a dry erase board, etc.), containers (e.g., a basket, a bin, etc.), or the like.

FIG. 3 is a side view of the mounting device 100 with the arm 202 in a substantially horizontal position in accordance with embodiments of the technology. FIG. 4 shows the mounting device 100 in a raised position adjacent to the wall 120. FIG. 5 shows the mounting device 100 angled downwardly in a lowered position. Referring now to FIG. 3, a user can manually move the television 110 between a raised position (FIG. 4) and a lowered position (FIG. 5). The arm 202 can function as a single-bar linkage pinned to the mounting bracket 201 and the television mounting bracket 203 to provide a relative low profile for enhanced range of motion as compared to, for example, four-bar or five-bar linkages. The configuration and operation of the arm 202 can be selected based on the range of motion.

A drive assembly 222 can interconnect movable components such that the television 110 is automatically positioned due to relative movement between components. One or more positional relationships (e.g., angular positions, rotational speeds, etc.) between two or more components can be maintained or controlled to position the television 110. In some embodiments, the drive assembly 222 can synchronize rotation of the television mounting bracket 203 with rotation of another component of the mounting device 100, such as the arm 202. For example, rotation of the arm 202 relative to the mounting bracket 201 can cause rotation of the television mounting bracket 203.

In some embodiments, the drive assembly 222 can securely hold and rotate the mounting bracket 203, which can be a single-pivot bracket. The drive assembly 222 can include, for example, indexers that cooperate to define discrete positions for the mounting bracket 203. The indexers can enmesh one another. For example, the drive assembly 222 can operate to hold the mounting bracket 203 at a vertical position while the arm 202 is rotated upwardly and downwardly. In some embodiments, the drive assembly 222 is a tilt inhibiting/arresting drive, which is linked to other components. The tilt inhibiting/arresting drive can be configured to keep the mounting bracket 203 at a particular orientation. Advantageously, the mounting device 100 can be reconfigured any number of times without recalibration due to the mechanical engagement between components.

Figure 8:
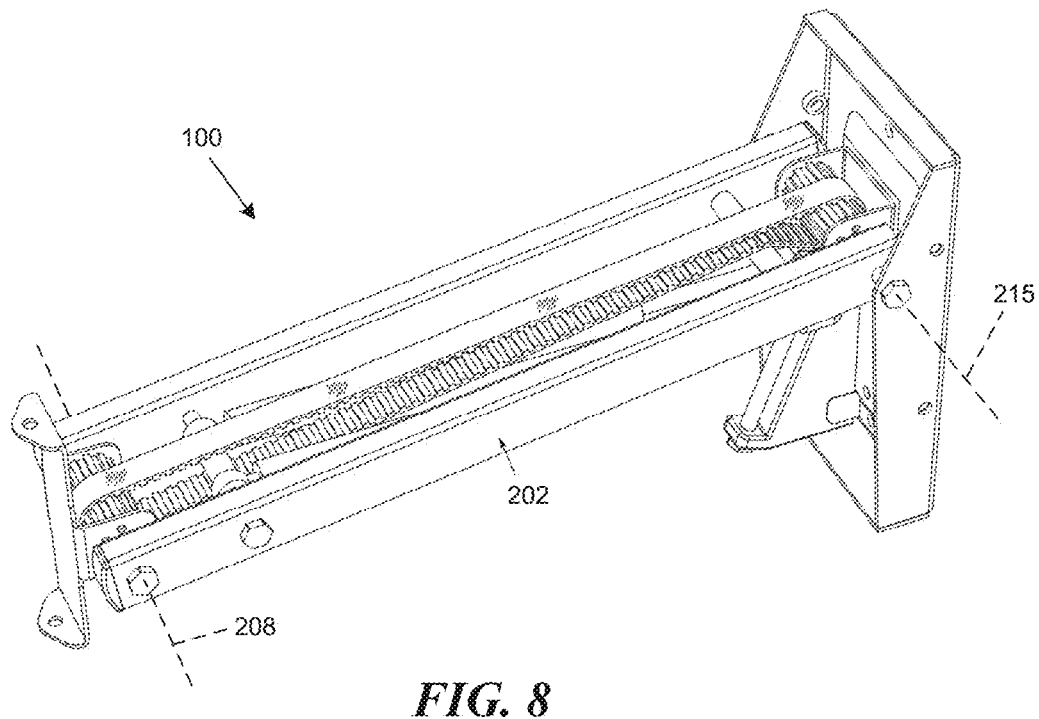
FIGS. 8-11 show components of the television mounting device of FIG. 7 in accordance with embodiments of the technology.

A pin or pivot 206 can pivotally couple the television mounting bracket 203 to the arm 202. A pin or pivot 205 can pivotally couple the arm 202 to the bracket 201. In some embodiments, the rotational speed of the television mounting bracket 203 relative to an axis of rotation 208 (see FIG. 8) defined by the pin 206 can be proportional or equal to the rotational speed of the arm 202 relative to an axis of rotation 215 (see FIG. 8) defined by the pin 205. In some embodiments, an angle of rotation of the television mounting bracket 203 about the axis of rotation 208 can be proportional or equal to an angle of rotation of the arm 202 about the axis of rotation 215. The television 110 can be kept parallel to a reference plane, such as a vertical plane 251 (indicated in dashed line in FIG. 3) parallel to the wall 120 or another plane. In one embodiment, the screen 160 of the television 110 can be kept substantially vertical at an angle between about 0 degrees and 5 degrees from vertical, such as angles less than 5 degrees, 4 degrees, 3 degrees, 2 degrees, or 1 degree from the vertical plane 251, thus substantially preventing tilting of the television 110. In some embodiments, a ratio of (1) an angle of rotation of the TV mounting bracket 203 relative to the arm 202 to (2) the angle of rotation of the arm 202 to the mounting bracket 201 can be 0.8, 0.9, 1, 1.1, 1.2, or ranges encompassing such ratios, during most or substantially all of the travel of the television 110. If the television 110 is mounted above a fireplace, the arm 202 can rotate about the axis of rotation 215 an angle θ (FIG. 5) in a range of about 90 degrees to about 160 degrees. Other angles are also possible, if needed or desired.

Referring now to FIGS. 3 and 4, the television mounting bracket 203 rotates counterclockwise relative to the arm 202 an angle α (see FIG. 4) when the arm 202 moves from the partially or fully lowered position to a raised or vertical position. Angle α can be from the screen of the television 110 to a plane generally perpendicular to a longitudinal axis (see longitudinal axis 213 of FIG. 6) of the arm 202. Referring now to FIGS. 3 and 5, the television mounting bracket 203 can rotate clockwise an angle α (see FIG. 5) of about 0 degree, 5 degrees, 10 degrees, 15 degrees, 20 degrees, or 30 degrees when the arm 202 is moved from the raised position to a lowered position. Referring now to FIG. 5, an angle of declination δ (FIG. 5) of the lowered arm 202 can be in a range of about 5 degrees to about 80 degrees, 5 degrees to about 70 degrees, 5 degrees to about 50 degrees, or other suitable ranges. If the mounting device 100 is positioned above a mantel, the maximum angle of angle of declination can be about 40 degrees, 50 degrees, or 60 degrees. Other angles are also possible. The configuration of the drive assembly 222 can be selected based on a desired positional relationship between mount components.

Referring again to FIG. 3, the drive assembly 222 can include one or more indexers 211, 212 and a flexible connector 225. The indexers 211, 212 (sometimes also referred to as "sprockets" and "gears" herein) can be fixed (e.g., rotationally fixed, translationally fixed, etc.) to the brackets 201, 203, respectively, using temporary or permanent attachment features, such as non-rotational connections or screws through holes discussed in connection FIG. 6. In some embodiments, the indexers 211, 212 are fixedly connected (e.g., non-rotatably connected) via welding or bonding to the brackets 201, 203, respectively. The flexible connector 225 can be a belt (e.g., a timing belt, a drive belt, an endless belt, etc.), a chain, or a flexible component that mechanically connects the indexers 211, 212. In some embodiments, the connector 225 is a timing belt configured such that the indexer 212 communicates directly with indexer 211. The timing belt or flexible connector 225 can be installed on the indexers 211, 212 when the television bracket 203 is at the desired orientation, thereby setting a positional relationship between brackets 201, 203. The torque applied to the indexer 212 can be about the axis of rotation 208, thereby rotating the television mounting bracket 203 without using a separate pinned connection. As such, the television mounting bracket 203 can operate as a single pivot bracket. Advantageously, the connector 225 can maintain the orientation of the television mounting bracket 203 throughout use without recalibration. A user can remove and reinstall the connector 225 any number of times to adjust the positioning of the television mounting bracket 203, thereby providing installation flexibility.

The indexers 211, 212 can be gears, pulleys (e.g., toothed pulleys), or sprockets and can have the same number of teeth such that the TV mounting bracket 203 and the arm 202 rotate in unison (e.g., rotate at the same rotational speed). The flexible connector 225 can apply a force (e.g., moment, torque, etc.) to the television mounting bracket 203 via the indexer 212 to hold the television at a target orientation. The vertical orientation of the television bracket can be maintained when the television bracket is moved vertically. In some embodiments, the indexers 211, 212 can have different numbers of teeth such that the TV mounting bracket 203 rotates relative to the arm 202 and mounting bracket 201 at different speeds. The configuration of the indexers 211, 212 can be selected based on a target mechanical advantage, a gear or velocity ratio (e.g., ratio of a diameter of driver indexer 211 to a diameter of driven indexer 212), output speed, output torque, or the like. An optional idler pulley 208 can engage the belt 225 and can be pivotally coupled to the arm 202.

As the mounting device 100 is manually raised or lowered, the belt 225 can engage the indexer 212 to maintain the same rotational alignment as the stationary indexer 211. The rotational position of the indexers 211, 212 can be such that the TV mounting bracket 203 remains substantially parallel to the wall 120 surface. In the illustrated embodiment, the screen of the television 110 can be held at a substantially vertical orientation throughout travel of the mounting device 100, as shown in FIGS. 3-5. The drive assembly 222 can be positioned alongside the arm 202 to reduce the profile of the deployed mounting device 100 and provide more downward travel than, for example, four-bar linage mounts with linkages that move away from one another. An optional covering 254 (shown in cross section in FIG. 3) can protect the internal moving components and can be carried by the arm 202.

FIG. 3 also shows the mounting device 100 including a counterbalancing mechanism 207 coupled to the arm 202 and mounting bracket 201. The counterbalancing mechanism 207 can include one or more gas springs, pistons, mechanical or motorized force adjustment devices, or combinations thereof. In some embodiments, the counterbalance mechanism 207 includes a biasing device 209 rotatably coupled to the arm 202 by a pivot 231 and coupled to a force adjustment device 213. The force adjustment device 213 can be similar to or include features of the counterbalancing mechanisms, adjuster mechanisms, or other features or technologies disclosed in U.S. Pat. No. 8,724,037, which is incorporated by reference in its entirety. The biasing device 209 can include one or more gas pistons, pneumatic pistons, springs (e.g., helical springs, compression springs, etc.), or other types of biasing devices capable of providing a desired force, including, without limitation, a substantially constant force, variable force, or the like. In other embodiments, pins, stops, or other features can be used to hold the arm 202 at a desired position.

The force adjustment device 213 can include a threaded rod 260 held by holders 338, 340 of the mounting bracket 201. The rod 260 can be rotated to move a carriage or block 332 upwardly or downwardly. The carriage 332 is rotatably coupled to the counterbalance mechanism 207 and can be in a first position such that the counterbalance mechanism 207 is in a first setting or configuration to provide a first balancing force. The carriage 332 can be moved to a second position such that the counterbalance mechanism 207 is in a second setting or configuration to provide a second balancing force that is substantially different from the first balancing force. For example, the first balancing force can counterbalance a television that weighs about 100 pounds wherein the second balancing force can counterbalance a television that weighs about 40 pounds. Other types of force adjustment mechanisms can include, without limitation, one or more motors (e.g., stepper motors, drive motors, etc.), rails, linear slides, threaded rods, pulleys, combinations thereof, or the like.

FIG. 6 is a side view of components of the mounting device 100 and the brackets 201, 203 are shown removed. Each of the brackets 201, 203 includes holes 216 configured to receive fasteners 217 (one installed fastener is identified in FIG. 6). The number, position, and configuration of the holes 216 and fasteners 217 can be selected based on the forces to be transmitted between the indexers 211, 212. The axes of rotation 215, 208 (see FIG. 18) can be defined by pivots or pins 205, 206, respectively. The pivots 205, 206 can be coupled to the brackets 201, 203. The axes of rotation 215, 208 can lie in an imaginary plane that is substantially parallel to a longitudinal axis 213 of the arm 202.

Figure 7:
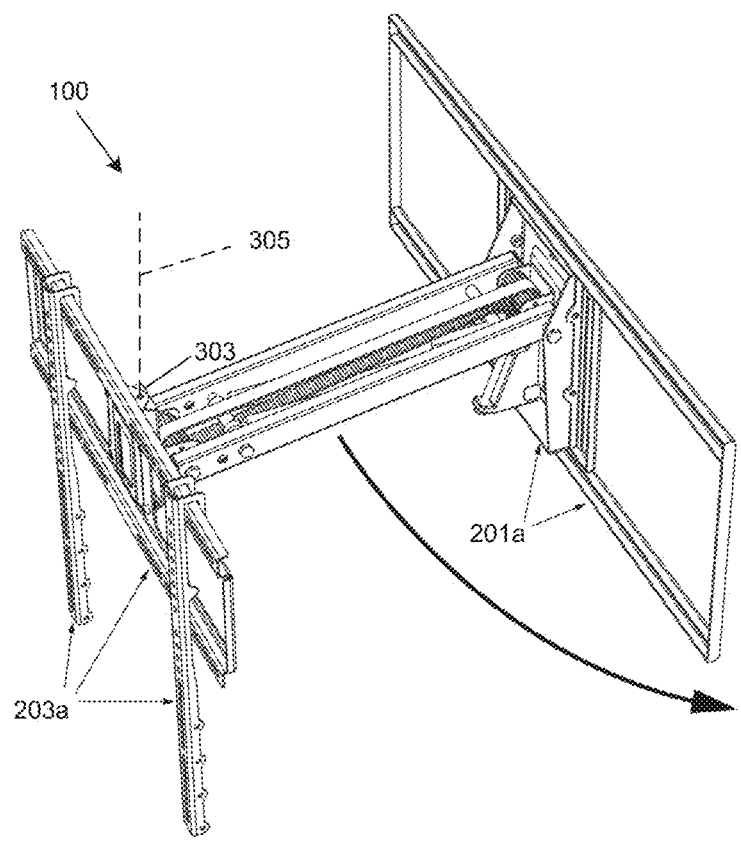
FIG. 7 is an isometric view of the television mounting device in accordance with an embodiment of the technology.

FIG. 7 is an isometric view of the mounting device 100 in accordance with an embodiment of the technology. The description of the mounting device 100 of FIGS. 1-6 applies equally to the mounting device 100 of FIG. 7 except as indicated otherwise. The mounting device 100 of FIG. 7 can include a swivel device 303 that allows side-to-side movement of the television mounting bracket 203. For example, the television mounting bracket 203 can rotate about a vertical axis of rotation 305 by manually pushing/pulling on the television (shown removed in FIG. 7). In other embodiments, the swivel device 303 can include one or more motors for automatic rotation. In some modes of operation, the motorized swivel device 303 can be synchronized with motors used to raise or lower the mounting device 100 to provide for complex fluid movements about multiple axes. In other embodiments, the motorized swivel device 303 can operate independently of the motors for raising and lowering the mounting device 100.

Methods for Adjusting the Weight Compensation of the Mounting Device

Figure 9:
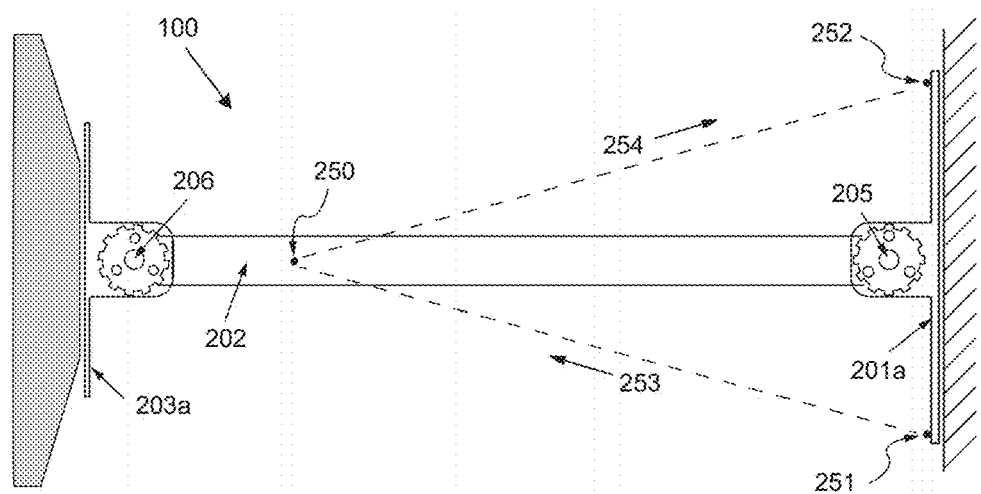
Figure 10:
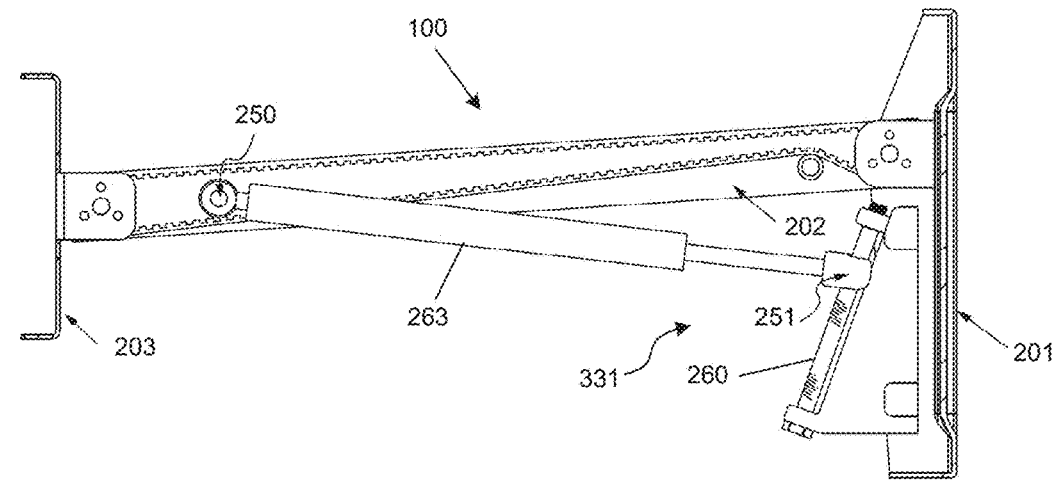
Figure 11:
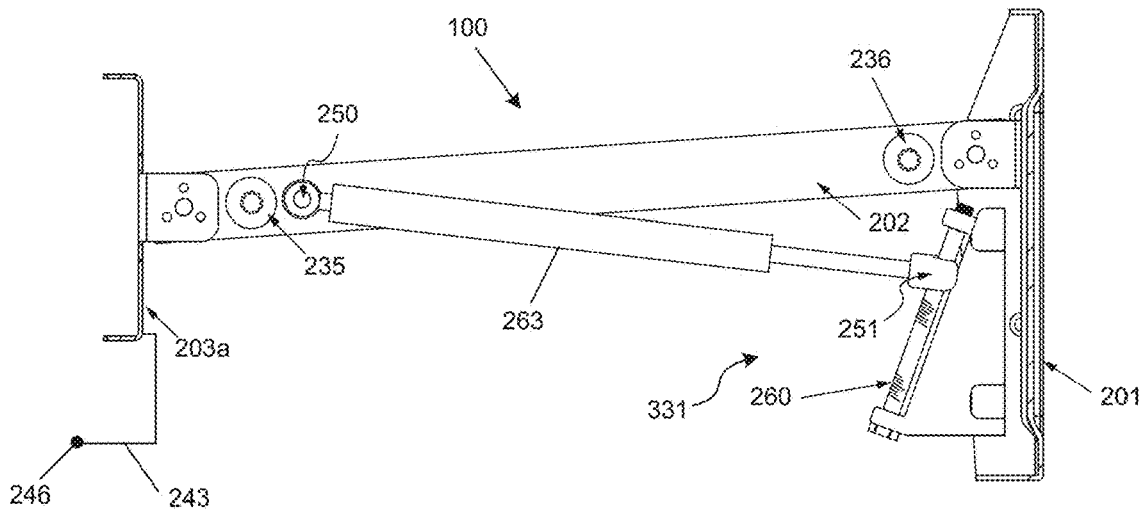

FIGS. 9-11 show a method of operating the mounting device 100 in accordance with embodiments of the technology. Referring now to FIG. 9, the mounting device 100 can include a means for pushing force, such as compression springs, gas springs, electronic actuators, or equivalent, located along a path 253 to push upward from a lower area 251 on the wall mounting bracket 201 to an area 250 on the arm 202. Alternatively, a means for pulling force, such as tension springs, gas springs, electronic actuators, a motorized cable pulley system, or equivalent, can be located along a path 254 to pull upward from a higher area 252 on the wall mounting bracket to an area 250 on the arm 202. The amount of compensating force that is applied can be selected as adjustable or fixed. In some embodiments, the mounting device 100 includes force generating devices along one or both the paths 253, 254. The mounting device 100 can be installed for desired motion (e.g., vertical or horizontal motion) of the arm 202. In embodiments for raising/lowering displays, FIG. 9 is a side view. In embodiments for horizontal movement of displays, FIG. 9 is a plan view.

FIGS. 10-11 show gas pistons 263 rotatably coupled to the arm 202. A user can manually adjust the relative position (e.g., increase or decrease angular position) of gas pistons 263 to adjust the force applied by the gas pistons 263 to the arm 202. For example, a carriage 332 can be translated up or down along a rotatable rod 260 (FIGS. 10 and 11). The configuration, functionality, and components of means for pushing can be selected based on the range of motion of the mount assembly, the weight of the television, and the size of the mounting device 100. The description of the mounting device 100 of FIGS. 1-11 can apply equally to other mounting systems and devices disclosed herein.

The television mounting portion of FIG. 11 includes a handle 243 with a temperature element 246 (e.g., temperature sensor, gauge, etc.). The temperature element 246 can change color in response to temperature changes. For example, the surface of the handle 243 can turn red when the handle is at or above a preselected temperature that could cause, for example, damage to the TV. In some embodiments, the temperature element 246 is a temperature sensor in communication with a controller (e.g., as discussed in connection with FIG. 29 below) and/or in communication with a computing device, such as a smart phone, computer, tablet, etc. Any of the mount devices disclosed herein can include a temperature detecting handle, temperature sensors, or components for providing environmental information.

Figure 12:
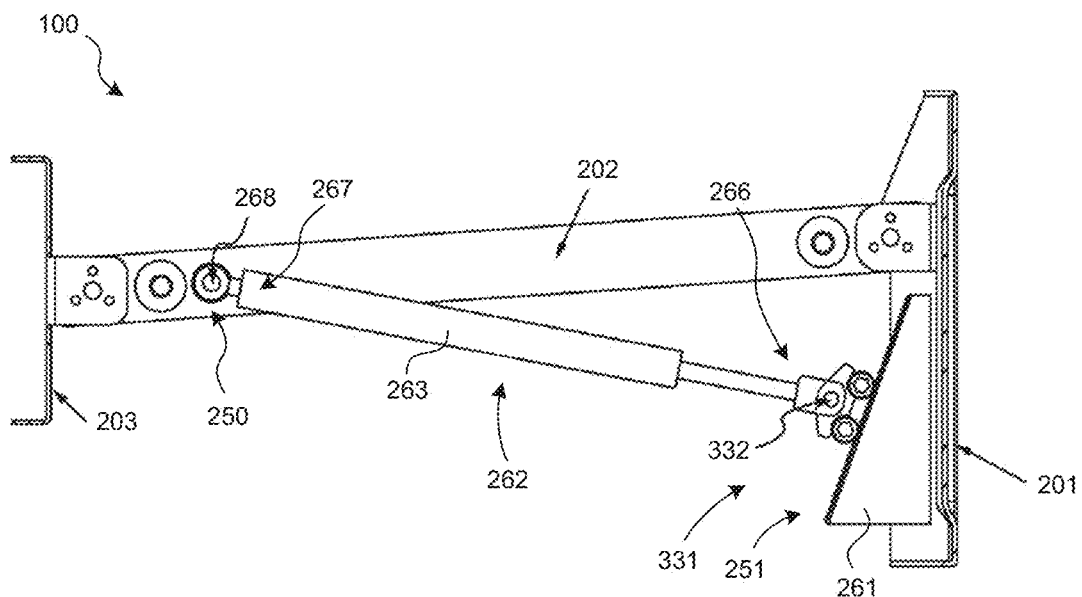
FIGS. 12-19 show components of a television mounting device in accordance with further embodiments of the technology.

FIGS. 12-19 illustrate a mounting device 100 in accordance with some embodiments of the technology. As illustrated in FIG. 12, the mounting device 100 can be generally similar to the mounting device discussed above with respect to FIGS. 10 and 11. The mounting device 100 includes a counterbalance mechanism 262 with at least one biasing mechanism and a lockable carriage 332. The biasing mechanism can be a gas piston 263 with the end 266 movable along the path 257 (FIG. 13) and located at the lower area 251 on the wall mounting bracket 201 and an end 267 located at the area 250 on the arm 202. In some embodiments, the end 267 of the gas piston 263 and display bracket 203 can be coupled to a pivot 268. In some embodiments, the end 267 of the gas piston 263 and display bracket 203 can be directly coupled to each other. The number, configuration, orientation, and mounting arrangement of the gas pistons can be selected based on the desired location, magnitude, and/or direction of the counterbalancing force.

FIG. 12 is a side view showing the gas piston 263 pushing on a bi-directional latching rack 261 ("rack 261") in the lower area 251. As discussed above, in some embodiments, the gas piston 263 can be swapped for another pushing means, such as one or more compression springs, pneumatic pistons, electronic actuators, or another suitable element. Alternatively, or additionally, in some embodiments, a means for a pulling force, such as tension springs, tension gas springs, electronic actuators, a motorized cable pulley system, or equivalent, can be located along a path 254 (FIG. 9) to pull upward from a higher area 252 on the wall mounting bracket to an area 250 on the arm 202. The gas piston 263 can be angled downwardly below the arm 202 to the lower area 251. The arm 202 can be a swing arm, a four-bar linkage, a five-bar linkage, or another arm or linkage assembly. In some embodiments, the arm 202 is a low-profile parallel mechanism in the form of a four-bar linkage configured to position a television close to the wall (e.g., within 3 inches, 4 inches, or 5 inches of the wall). U.S. Pat. Nos. 8,724,037 and 9,876,984 disclose swing arms, linkage assemblies (e.g., four-bar linkage, five-bar linkage, etc.), mount features, and methods of using the same. The components of the counterbalancing devices and mechanisms of U.S. Pat. Nos. 8,724,037 and 9,876,984 can be incorporated into mounts disclosed herein. For example, the mounting device 100 of FIG. 12 can include a plurality of counterbalancing components, such as two gas pistons coupled to a four-bar linkage or a five-bar linkage 202.

Further, similar to above, the amount of counterbalancing force that is applied can be adjusted by adjusting the length of the gas piston 263, pressure within the gas piston 263 (e.g., pressure increased or decreased using a bleed valve, shock pump, etc.), and/or the location from which that the gas piston 263 pushes upwards from. For example, in some embodiments, the mounting device 100 can include an adjustment mechanism 331 configured to selectively increase or decrease the counterbalancing force provided by the gas piston 263. The adjustment mechanism 331 is rotatably coupled to the fixed support bracket 201 and has an unlocked state for adjusting counterbalancing and a locked state for setting/maintaining counterbalancing.

In the embodiment depicted in FIG. 12, the adjustment mechanism 331 includes the rack 261 and the carriage 332, illustrated as a pinion carriage. When the adjustment mechanism 331 is in the unlocked state, the carriage 332 can be translated up or down along the rack 261, thereby adjusting the counterbalancing force. When the adjustment mechanism 331 is in the locked state, the carriage 332 can be prevented from traveling along the rack 261, for example by locking pinion gears of the carriage (e.g., as described in more detail below). The adjustment mechanism 331 can be held in the locked state by compressive forces applied by the gas piston 263. In some embodiments, the adjustment mechanism 331 can be manually transitioned between the locked state and the unlocked state without utilizing tools. The carriage 332 can be separated from and moved along the rack 261. In some embodiments, the adjustment mechanism 331 can be transitioned between the locked state and the unlocked state by common tools (e.g., a wrench, screwdriver, or other suitable tool). The tools can be used to drive apart components of the carriage 332 to, for example, unlock the pinions and/or to force rotation of components of the carriage 332.

The position (e.g., vertical position, position along the rack 261, etc.) of the carriage 332 can be selected based on the range of motion of the mount assembly, the weight of the television, and/or the size of the mounting device 100. One disadvantage of the embodiment depicted in FIGS. 10 and 11, however, is that the rotatable rod 260 requires numerous full rotations (e.g., several dozen full rotations) to change the needed force from a light TV to a heavy TV. In the embodiments illustrated in FIGS. 12-19, the counterbalancing can be quickly adjusted by moving the carriage 332 up or down along the rack 261. An optional protective housing or covering (not shown) can surround the carriage 332 and rack 261 to keep wires and other objects away from moving components.

Figure 13:
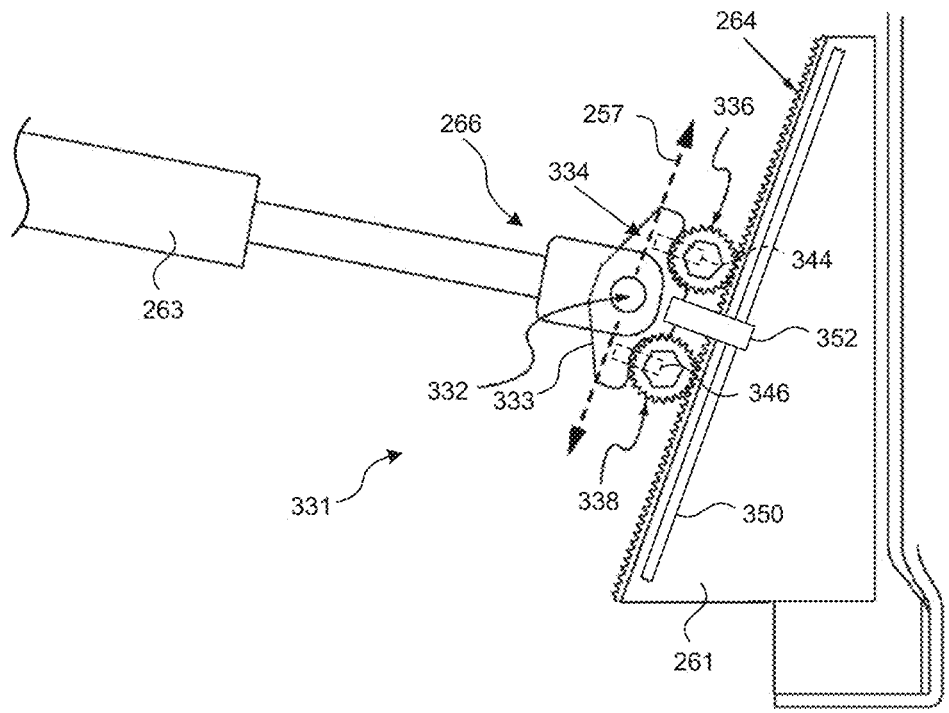

Referring now to FIG. 13, the carriage 332 includes a body 333 and a pinion assembly 334 that mates with the rack 261. The pinion assembly 334 includes a first pinion gear 336 and a second pinion gear 338 (collectively referred to as "gears 336, 338"). The pinion assembly 334 can also include a first connection arm 344 coupling the first pinion gear 336 to an upper end of the body 333 and a second connection arm 346 connecting the second pinion gear 338 to a lower end of the body 333. The rack 261 includes teeth 264 that mate with the pinions or gears 336, 338. When the gears 336, 338 are rotated clockwise, the carriage 332 moves upward along the rack 261 along the path 257; when the gears 336, 338 are rotated counter-clockwise, the carriage 332 moves downward along the rack 261 along the path 257. As further illustrated in FIG. 13, for example, the rack 261 can be at an inclined orientation (e.g., at an angle of inclination equal to or greater than 60 degrees, 70 degrees, 80 degrees, or 85 degrees). In some embodiments, the rack 261 can be at a vertical or upright orientation such that the end 266 of the gas piston 263 travels substantially vertically (e.g., along an axis perpendicular to a horizontal plane). The terms "substantially vertically" and "substantially vertical" generally refer to an angle within about +/−2 degrees of vertical, for example, within about +/−1 degree of vertical such as within about +/−0.8 degrees of vertical. Substantially vertical also refers to ranges of small angles from vertical, for example, angles between about 0.1 degrees and 1.8 degrees from vertical, such as angles between about 0.2 degrees and about 1.2 degrees, for example angles between about 0.3 degrees and about 0.8 degrees. Example carriages and racks are discussed in connection with FIGS. 13-19.

In some embodiments, a combination of the pressure from the gas piston 263 and mating between the teeth 264 and the gears 336, 338 can hold the carriage 332 in place along the rack 261. In the illustrated embodiment, the carriage 332 also includes a latching mechanism 352 (not shown in FIG. 12), and the rack 261 includes a guide or track 350 (not shown in FIG. 12) extending general parallel to a row of teeth 264 of rack 261. The latching mechanism 352 can mate with the track 350 to further maintain the carriage 332 on the rack 261. For example, as described in more detail below, the gas piston 263 can exert enough pressure to maintain the vertical position of the carriage 332 while the latching mechanism 352 can ensure that the carriage 332 engages the rack 261. For example, the latching mechanism 352 can prevent the carriage 332 from being pulled laterally off the rack 261 when the mounting device 100 is moved to a raised position. As such, the latching mechanism 352 can translationally fix the carriage 332 to the rack 261 and can be removed, or moved to an unlocked position, to move the carriage 332 along the rack 261.

Figure 14:
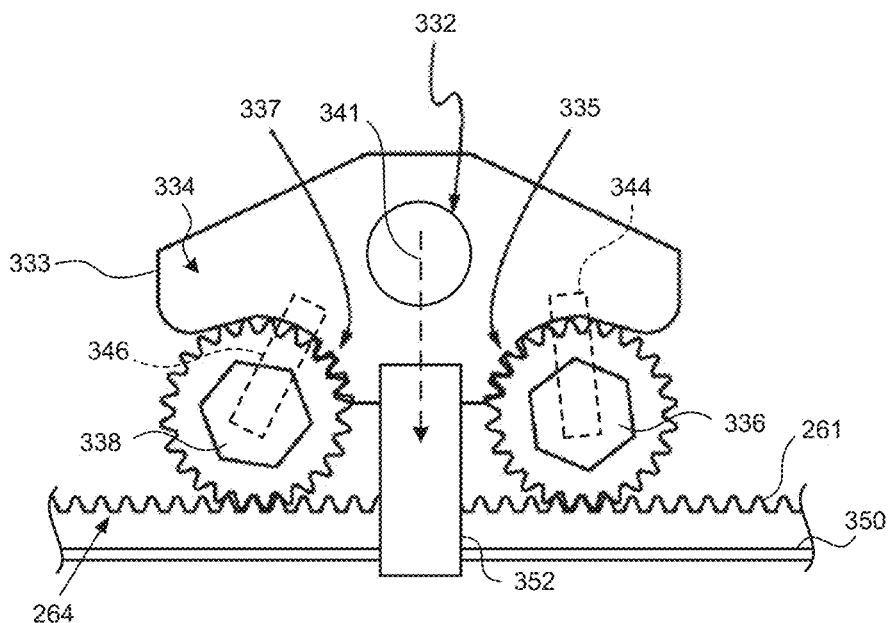
Figure 15:
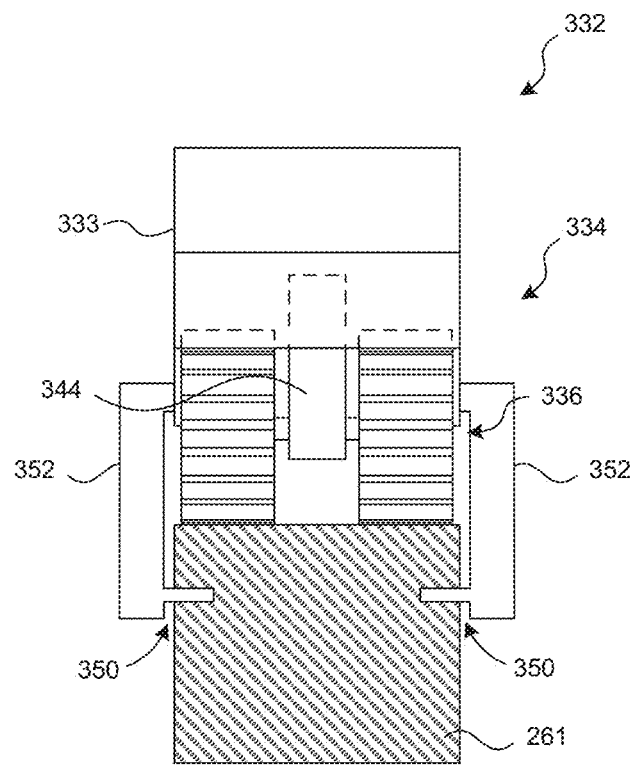

FIGS. 14 and 15 are a side view and a back view, respectively, illustrating additional details of the carriage 332 in a static position along the rack 261 (e.g., when the adjustment mechanism 331 (FIG. 12) is in the locked state). As illustrated in FIG. 14, the body 333 includes pawl teeth 335 facing the first pinion gear 336 and pawl teeth 337 facing the second pinion gear 338. When the gas piston 263 (FIGS. 12 and 13) pushes the body 333 toward the rack 261, the pawl teeth 335 enmesh the first pinion gear 336 and the pawl teeth 337 enmesh the second pinion gear 338 to rotationally lock the gears 336, 338. As a result, the pinion assembly 334 is rotationally locked and the carriage 332 is translationally fixed to the rack 261. That is, in a static, loaded position, weight from the TV is transmitted to the gas piston 263, which then applies a force to the carriage 332 in the direction of arrow 341 (FIG. 14). The force causes an opposing engagement between the pawl teeth 335, 337 and the gears 336, 338, respectively, as well as an opposing engagement between the gears 336, 338 and the teeth 264 of the rack 261. As a result of the two engagements, the force prevents the gears 336, 338 from rotating, thereby maintaining the carriage 332 in place along the rack 261.

However, if a counter-weight is applied to the gas piston 263 (FIG. 13), for example by a user lifting the mounted TV, the gas piston 263 may no longer apply the compressive force to the carriage 332 (e.g., if the gas piston 263 becomes fully extended or extends too slowly). As a result, the pawl teeth 335, 337 may disengage the gears 336, 338 and/or the gears 336, 338 may disengage the teeth 264 of the rack 261. Once either disengagement occurs, the carriage 332 can move along and/or fall off the rack 261. To prevent the disengagements, in some embodiments, the pinion assembly 334 includes the latching mechanism 352 releasably connected to the track 350. While connected, the latching mechanism 352 can prevent the disengagements by applying a second force in the direction of arrow 341. Like the forces discussed above, when the latching mechanism 352 holds the body 333 or pulls the body 333 toward the rack 261, the pawl teeth 335 enmesh the first pinion gear 336 and pawl teeth 337 enmesh the second pinion gear 338 to rotationally lock the gears 336, 338. As a result, the pinion assembly 334 is rotationally locked and the carriage 332 is translationally fixed to the rack 261, even when the counter-weight is applied. Accordingly, the adjustment mechanism 331 can remain locked when the television is repeatedly lowered and raised.

In some embodiments, for example as illustrated in FIG. 15, the pinion assembly 334 can include two latching mechanisms 352 connected to either side of the pinion assembly 334 and/or carriage body 333. Similarly, the rack 261 (shown in cross section) can include two tracks 350 corresponding to each of the two latching mechanisms 352. The tracks 350 can be longitudinally-extending slots, rails, or the like on one side or both sides of the rack 261. Each of the two latching mechanisms 352 can provide a force to help maintain the position of the carriage 332 on the rack 261. In some embodiments, the rack 261 can include one or more protrusions, locking features, etc. configured to mate with the latching mechanisms 352 rather than the track 350.

FIG. 15 also illustrates a view of the first connection arm 344 in accordance with some embodiments of the present technology. In the illustrated embodiment, the first connection arm 344 holds a central axel of the first pinion gear 336. In some embodiments, the second connection arm 346 (FIG. 14) holds a central axel of the second pinion gear 338. In various embodiments, the components of the pinion assembly 334 can be held together using one or more additional, or alternative, components. For example, each of the gears 336, 338 can be held together with the pinion assembly 334 using one or more alternative brackets (e.g., as discussed below with respect to FIGS. 18 and 19). Further, in other embodiments, the carriage 332 can be held in place on the rack 261 by one or more additional, or alternative, components. For example, the rack 261 can include a central track with a bolt configured to mate with the carriage 332 to help maintain the carriage 332 in place on the rack 261.

Figure 16:
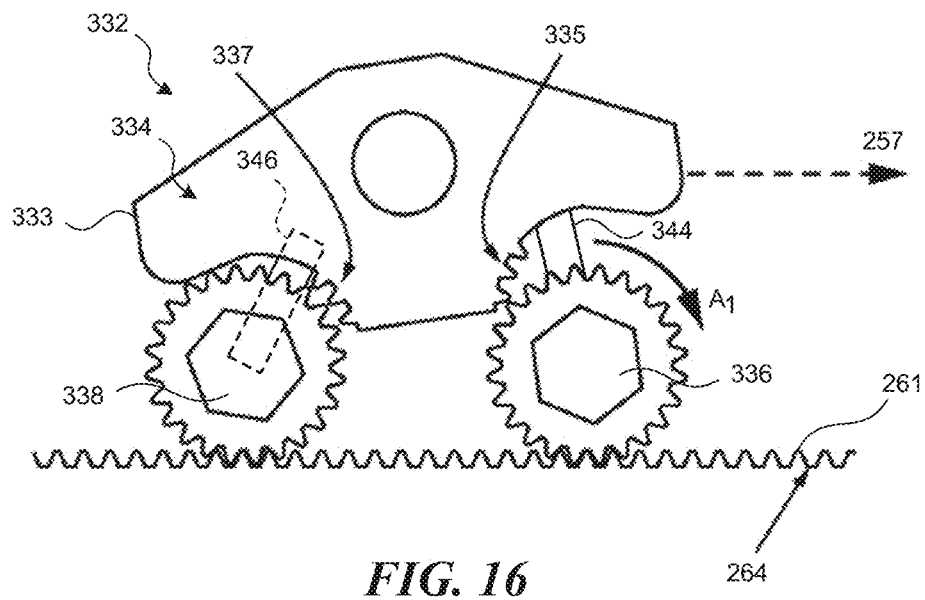
Figure 17:
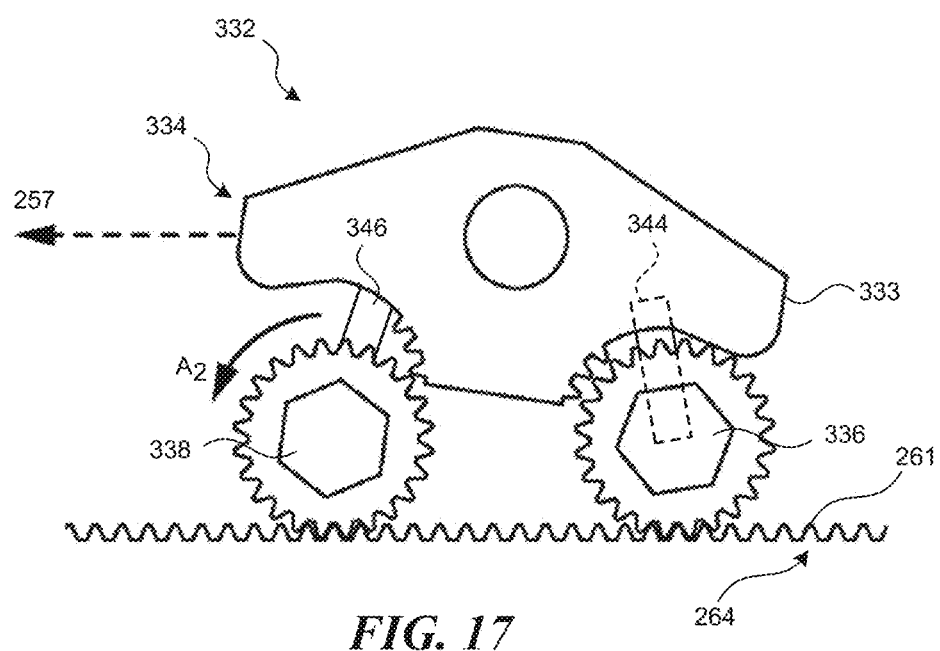

FIGS. 16 and 17 are side views illustrating a method of repositioning the carriage 332 on the rack 261 in accordance with some embodiments of the present technology. In the illustrated embodiments, the latching mechanism (e.g., latching mechanism 352 shown in FIG. 14) has been removed to allow the gears 336, 338 to disengage both the pawl teeth 335, 337 and the teeth 264 of the rack 261.

As illustrated with respect to FIG. 16, the first pinion gear 336 can be rotated clockwise to move the carriage 332 upward along path 257. In some embodiments, the first pinion gear 336 can be rotated by pushing on the carriage 332 and/or using a wrench or other suitable tool. In some embodiments, the first pinion gear 336 can include external grips, allowing the first pinion gear 336 to be rotated clockwise by hand. As further illustrated with respect to FIG. 16, the first pinion gear 336 pushes on the pawl teeth 335 of the pinion assembly 334 as it rotates, thereby causing the pinion assembly 334 to disengage with the first pinion gear 336 and rotate in a counter-clockwise direction. The counter-clockwise rotation causes the lower end of the body 333 to push down on the second pinion gear 338, thereby raising the pawl teeth 337. As the pawl teeth 337 rise, the pinion assembly 334 also disengages with the second pinion gear 338, allowing the second pinion gear 338 to rotate. In some embodiments, the second pinion gear 338 can be connected to the first pinion gear 336 by another bracket or other suitable means (not shown) that causes the second pinion gear 338 to rotate automatically with the first pinion gear 336. In some embodiments, the second pinion gear 338 can be rotated by hand and/or using any suitable tool concurrently with the first pinion gear 336.

In some embodiments, each time a tooth of the first pinion gear 336 passes a mating tooth of the pawl teeth 335 on the pinion assembly 334, the carriage 332 snaps back downward resulting in an audible click. In some embodiments, the distance the carriage 332 travels along the path 257 for each click can be configured to represent a predetermined amount of compensation for the weight loaded on the TV mounting bracket 203 (FIG. 12). For example, in some embodiments, one click can be configured to equal to one pound of compensation for the weight loaded on the TV mounting bracket 203.

Similarly, as illustrated with respect to FIG. 17, the second pinion gear 338 can be rotated counter-clockwise to move the carriage 332 downward along path 257. In some embodiments, the second pinion gear 338 can be rotated using a wrench or other suitable tool. In some embodiments, the second pinion gear 338 can include external grips, allowing the second pinion gear 338 to be rotated counter-clockwise by hand. As further illustrated with respect to FIG. 17, the second pinion gear 338 pushes on the pawl teeth 337 of the pinion assembly 334 as it rotates, thereby causing the pinion assembly 334 to disengage with the second pinion gear 338 and rotate in a clockwise direction. The clockwise rotation causes the upper end of the body 333 to push down on the first pinion gear 336, thereby raising the pawl teeth 335. As the pawl teeth 335 rise, the pinion assembly 334 also disengages with the first pinion gear 336, allowing the first pinion gear 336 to rotate. In some embodiments, the first pinion gear 336 can be connected to the second pinion gear 338 by another bracket or other suitable means (not shown) that causes the first pinion gear 336 to rotate automatically with the second pinion gear 338. In some embodiments, the first pinion gear 336 can be rotated by hand and/or using any suitable tool concurrently with the second pinion gear 338.

As a result of the method described with respect to FIGS. 16 and 17, the carriage 332 can be adjusted from the highest position along the rack 261 to the lowest position, or vice versa, with only a low number of rotations of the gears 336, 338. Accordingly, the weight compensation provided by the mounting device 100 to the can be adjusted much faster than through the many rotations of the rod 260 (FIG. 11). Accordingly, the inclusion of the pinion assembly 334 into the carriage 332 can increase the adjustability of the mounting device 100.

As further illustrated with respect to FIGS. 16 and 17, each of the first and second connection arms 344, 346 provide some travel for the gears 336, 338, allowing the rotation method described above. For example, as illustrated in FIG. 16, the first connection arm 344 can be extended by at least the distance the pinion assembly 334 rises away from the first pinion gear 336. In some embodiments, the first connection arm 344 can have an expandable component (e.g., a compression spring) and/or can include an ovular central orifice that mates with the central axel of the first pinion gear 336 (FIG. 15). Similarly, as illustrated in FIG. 17, the second connection arm 346 can be extended by at least the distance the pinion assembly 334 rises away from the second pinion gear 338. In some embodiments, the second connection arm 346 can have an expandable component (e.g., a compression spring) and/or can include an ovular central orifice that mates with a central axel of the second pinion gear 338.

Figure 18:
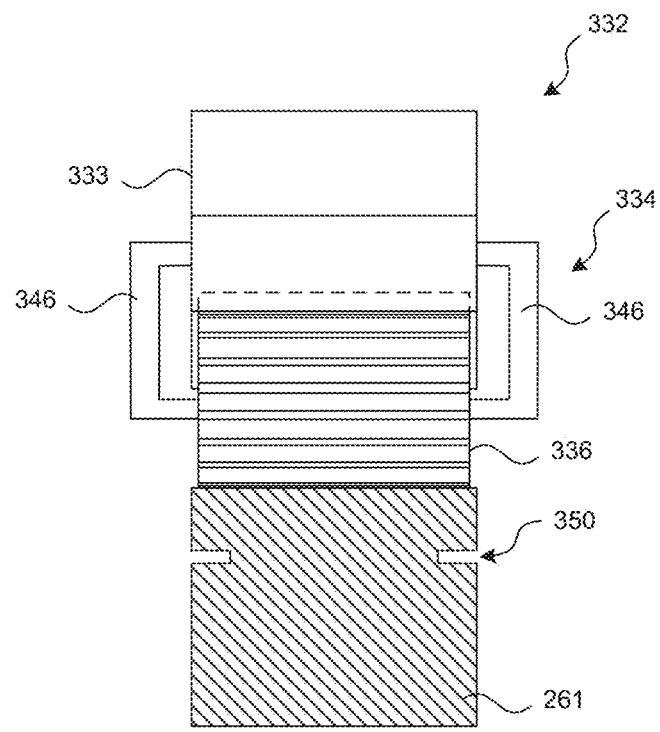

FIG. 18 is a front view of the carriage 332, the pinion assembly 334, and the rack 261 (shown in cross section) in accordance with further embodiments of the present technology. The latching mechanism 352 (FIG. 13) has been omitted to simplify the view of the illustrated embodiment, leaving the track 350 empty. As illustrated in FIG. 18, the piston assembly 334 can include one or more external brackets 346 connecting the first piston gear 336 to the body 333 of the carriage 332 in place of the first connection arm 344 (FIG. 13). In some embodiments, the piston assembly 334 also includes one or more brackets (not shown) connecting the second piston gear 338 to the body 333 of the carriage assembly 334. In some embodiments, the brackets can connect both of the gears 336, 338 to the pinion assembly 334. In some embodiments, the brackets can also link the rotation of the gears 336, 338.

Figure 19:
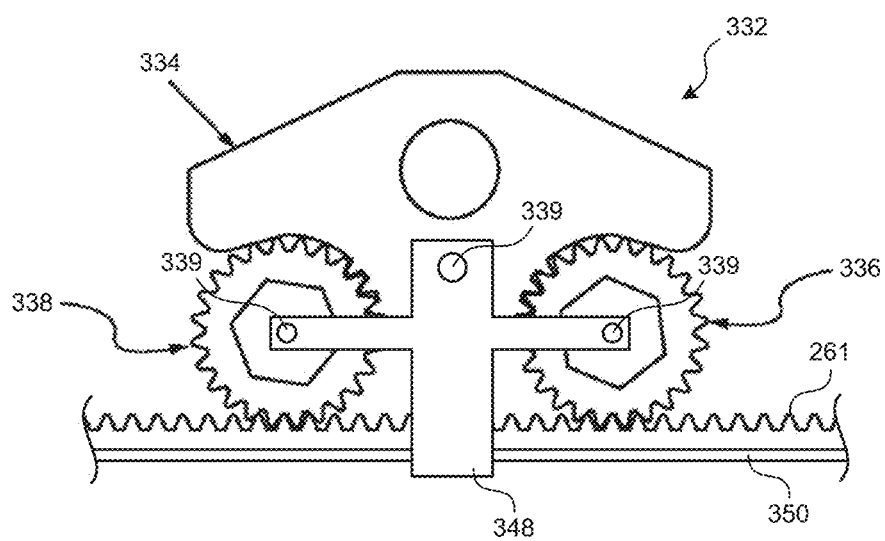

FIG. 19 is a side view of the carriage 332, the pinion assembly 334, and the rack 261 in accordance with further embodiments of the present technology. In the illustrated embodiment, the pinion assembly 334 includes a t-shaped latching mechanism 348 in place of the latching mechanism 352 and the connection arms 344, 346 (FIG. 13). Further, in the illustrated embodiment, the latching mechanism 348 is connected to the main body 333 of the carriage 332 and each of the gears 336, 338 through connection components 339 (e.g., pins, screws, or any other suitable component), while the bottom of the latching mechanism 352 mates with the track 350. As a result, the latching mechanism 348 can hold the carriage 332 against the rack 261 while also maintaining the position of the gears 336, 338 with respect to the pinion assembly 334. In some embodiments, the left and right arms of the latching mechanism 348 can include a component allowing the gears 336, 338 to travel a small amount with respect to the pinion assembly 334, thereby allowing the gears 336, 338 to rotate as described above with respect to FIGS. 16 and 17.

The description of the mounting device 100 of FIGS. 1-19 can apply equally to other mounting systems and devices disclosed herein. The features and components discussed in connection with FIG. 12-19, for example, can be incorporated into or used with other mounts disclosed herein. For example, the mounting device 100 of FIGS. 1 and 2, mounting device 300 of FIGS. 20-21, mounting device 400 of FIG. 22, mounting device 500 of FIGS. 23-25, mounting device 600 of FIG. 26-30, mounting device 700 of FIG. 31, mounting device 800 of FIG. 32-34, mounting device 870 of FIG. 35, and mounting device 880 of FIG. 36 can include the counterbalance mechanism 262 or its components. Adjustment mechanisms can be incorporated into other mounts disclosed herein and can be manual or motorized. Motorized adjustment mechanisms can include carriages with motors operable to drive the carriages along racks, rails, linear gears, etc. Another motorized adjustment mechanism can include a motorized actuator or pulley operable to lock/unlock and move the carriage. Carriages can include any number of gears, including pinion gears, spur gears, or other gears. Other mounts can also be unlocked/locked. In the embodiment depicted in FIGS. 10 and 11, the adjustment mechanism includes a rotatable rod and the carriage 332, where the carriage 332 can be translated up or down along the rotatable rod 260. When the adjustment mechanism 331 is in the unlocked state, the carriage 332 is configured to travel along the rod 260, thereby adjusting the counterbalancing force. When the adjustment mechanism 331 is in the locked state, the rod 260 can be fixed in place, preventing the carriage 332 from translating along the rod 260. Latching mechanisms, pins, or the locks can rotationally fix the rod 260. The adjustment mechanisms and counterbalance mechanism can include actuators, sensors, controllers, and other components for providing feedback and control.

Further Methods for Adjusting the Position of the Mounting Device

Figure 20:
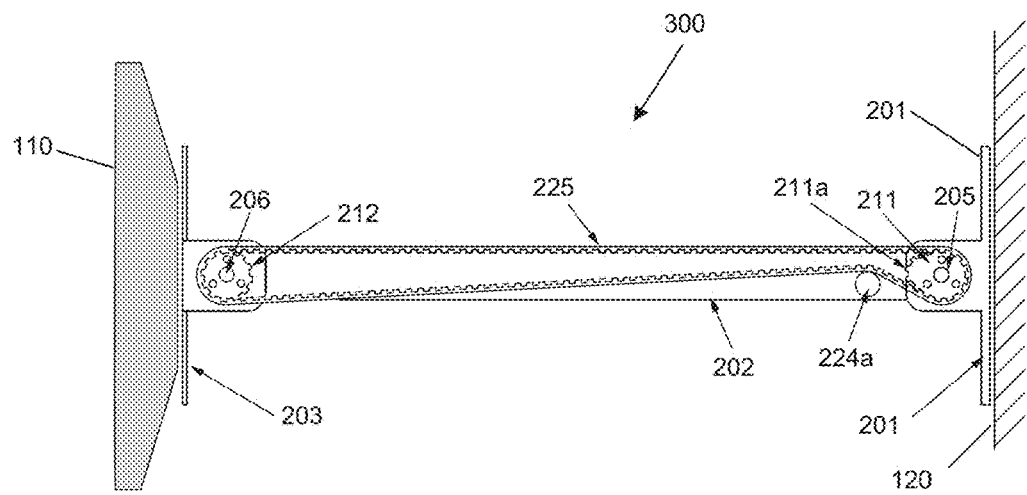
FIG. 20 is a side view of a manual television mounting device in accordance with embodiments of the technology.

FIG. 20 is a side view of a mounting device 300 in accordance with embodiments of the technology. The television 110 can also be tilted from a first position to a second position. For example, the television 110 can be angled downwardly when in the raised position and can move to a generally vertical orientation when in the lowered position. The indexer or sprocket 211 has a lobe 211a (FIG. 21) to perform the function of a cam. When the arm 202 is in the lowered position, the cam lobe 211a does not touch the timing belt 225. As the arm 202 is raised, the cam lobe 211a engages and requires more length of the timing belt 225, causing indexer or sprocket 212 to rotate forward faster than the alignment of sprocket 211. This will cause the TV mounting bracket 203, and therefore the television 110, to tilt forward in relation to the wall as the TV is raised so that the TV can be tilted in the up position and not tilted in the lowered position. The cam lobe 211a could instead be a separate piece adjacent to a round sprocket 211 such as a block or pin that is inserted and removed as desired. The pulley 224 can function as a tensioner pulley. In some embodiments, the television system can include a mount and different types of indexers (e.g., sprockets) that can be installed by the user. A user can install the indexers selected based on the desired type of motion.

Additionally, or alternatively, the sprockets can be incorporated into other components. For example, a mounting bracket 201 of FIG. 20 can have an integrated indexer or sprocket 211 formed via, for example, a machine or molding process. A lobe or spacer can be installed on the integrated sprocket 212 to adjust the positional relationship of the television 110 and bracket 203. In other embodiments, the sprocket 212 can be a separate component mounted to the wall 120. For example, the sprocket 211 can be mounted directly to the wall 120 using one or more connectors. The arm 202 would move relative to the sprocket 211, which remains stationary during use. The configuration, shape, dimensions, and mounting arrangements of sprockets 211, 212 can be selected based on the selected motion of the television 110.

Figure 22:
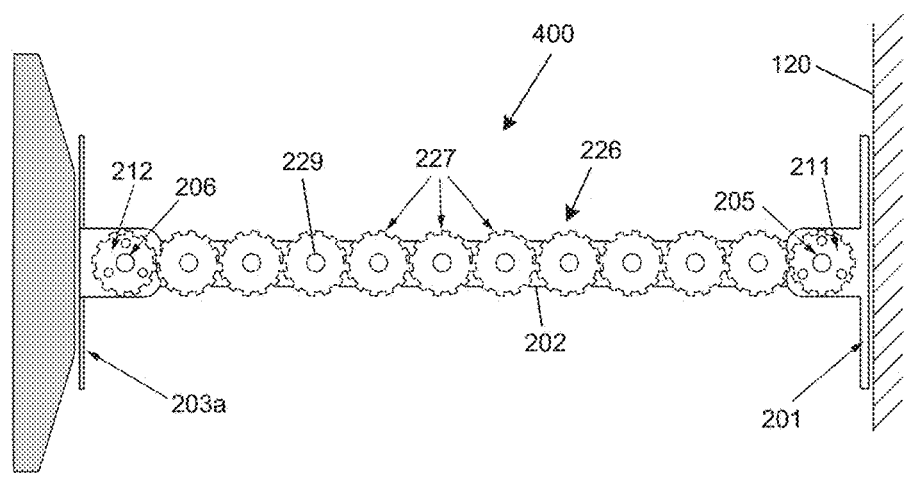
FIG. 22 is a side view of a television mounting device with a gear drive train in accordance with embodiments of the technology.

FIG. 22 is a side view of a mounting device 400 in accordance with embodiments of the technology. The mounting device 400 can include a gear train or gear assembly 226 ("gear assembly 226"). The gear assembly 226 includes a set of idler gears 227 and gears 211, 212. The idler gears 227 can be pivotally mounted to the arm by respective pins 229 (one identified in FIG. 22) and can be geometrically congruent to one another. The number, configuration, and placement of the gears 227 can be selected based on configuration of the arm 202. Each of the gears 211, 212 enmeshes with a respective outer idler gear 227 such that the gear 212 communicates directly with gear 211 via idler gears 227.

As the mounting device 400 is manually raised or lowered, the idler gears 227 cause the idler gear 212 to keep the same rotational alignment as the gear 211. The adjacent idler gears 227 rotate in opposite directions to cause rotation of the gear 212 about the pivot 206. The stationary gear 211 can be fixed to the wall mounted bracket 201, so the TV mounting bracket 203 is kept substantially parallel to the wall 120. The gear assembly 226 can include one or more worm gears, spur gears, pulley systems, motors, pivots, or combinations thereof selected based on the desired configuration of the mounting device 400, mechanical advantage, and/or range or motion.

Figure 23:
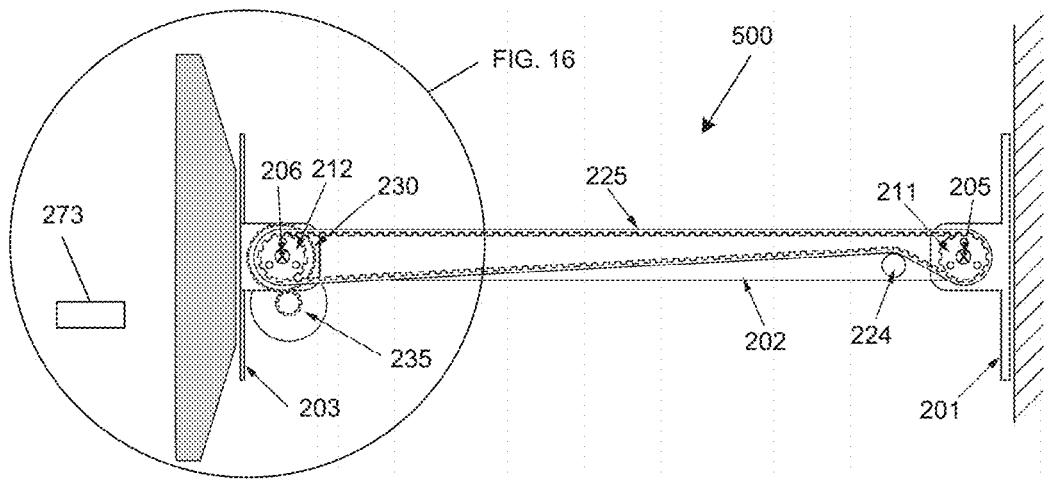
FIGS. 23 and 24 are side views of a television mounting device in accordance with embodiments of the technology.

FIG. 23 is a side view of a mounting device 500 in accordance with embodiments of the technology. The mounting device 500 can include sprockets 211, 212 and an auxiliary gear 230. The sprocket 212 can be rotationally fixed to the gear 230 and to the TV mounting bracket 203. A motor 235 carried by the arm 202 can operate to adjust the angular position of the TV mounting bracket 203. In operation, the motor 235 can rotate the gear 230, the sprocket 212, and the television mounting bracket 203 so as to change the angle of the television mounting bracket 203 relative to the arm 202. The motor 235 can be a stepper motor, a drive motor, or another motor capable of driving the components of the mounting device 500. When the motor 235 rotates the sprocket 212 about the pivot 206, the connector 225 forces the sprocket 212 to maintain rotational alignment with the sprocket 211 such that the arm 202 rotates about pivot 205 to keep the TV mounting bracket 203 at a target position (e.g., a substantially parallel orientation relative to the wall or another suitable position). Accordingly, the illustrated arrangement ensures that the TV mounting bracket 203 remains at the same angular or tilt position as the TV mount 500 is raised and lowered.

Figure 24:
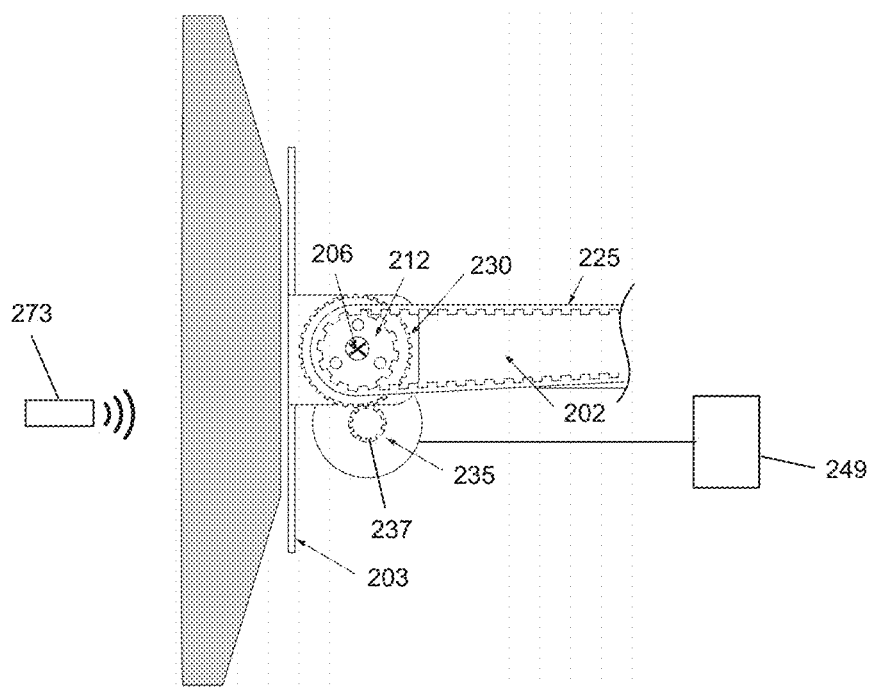

FIG. 24 is a detailed view of the components of the mounting device 500. The motor 235 has a drive gear 237 that engages the gear 230, which can be translationally fixed to the sprocket 212. When the motor 235 operates, the drive gear 237 rotates, causing rotation of the gear 230, which in turn causes rotation of the sprocket 212. The configuration and connection between the gears can be selected based on target gear ratios, mechanical advantage, or the like.

The motor 235 is in communication with a controller 249 via a wired or wireless connection. The controller 249 can include, without limitation, one or more electronic modules, power supplies, software, or combinations thereof. The controller 249 can include a receiver that is communicatively coupled (e.g., wirelessly coupled, capacitively coupled, inductively coupled, or the like) to a transmitter of a remote control 273. Exemplary controllers and controller components are discussed in connection with FIG. 37.

The controller 249 and/or remote control 273 can include one or more input elements (e.g., keys, touch screen, buttons, etc.), microphones, and memory. Buttons can include preset position buttons, up/down buttons, tilt buttons, swivel buttons, or the like. The memory can include, without limitation, volatile memory, non-volatile memory, read-only memory (ROM), random access memory (RAM), and the like. Stored information can include, but is not limited to, executable instructions for performing methods disclosed herein, settings, the weight of the mounted object, or the like. Settings can include, but are not limited to, position settings (e.g., stowed positions, lowered positions, intermediate positions, or the like), schedules (e.g., schedules to automatically move the object), or the like.

Figure 25:
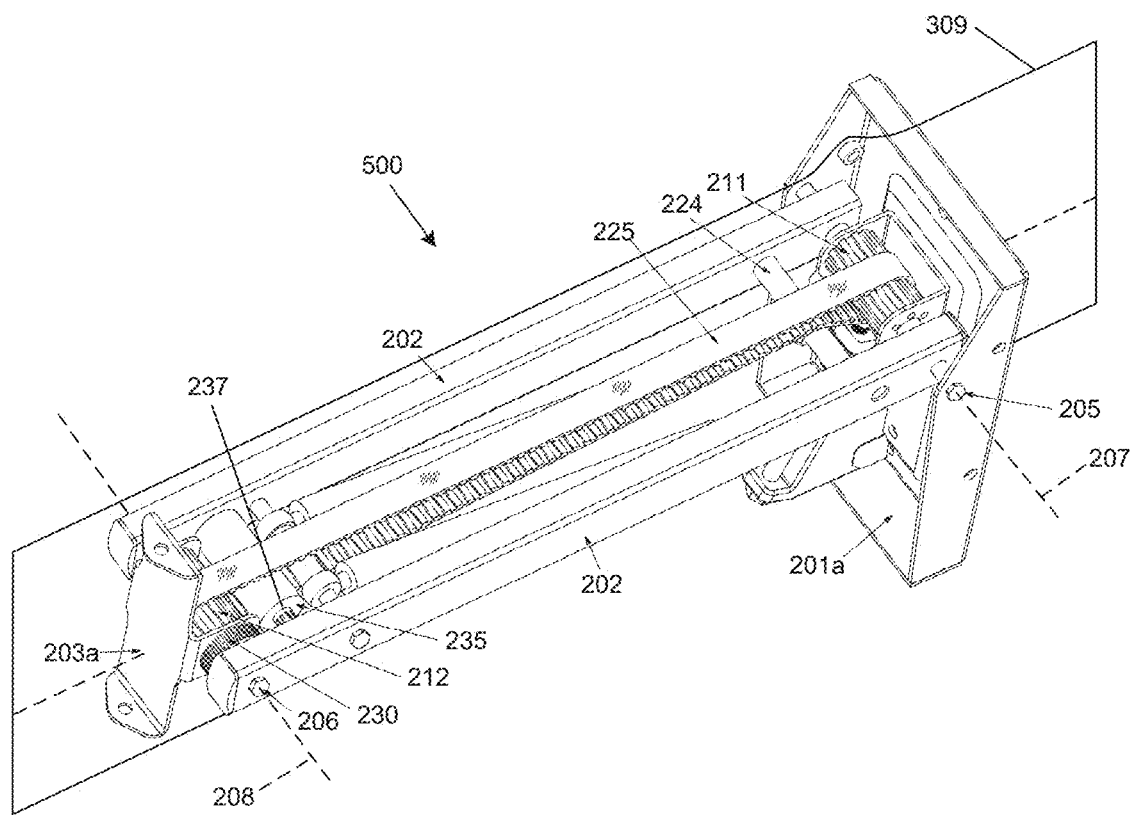
FIG. 25 is an isometric view of components of the television mounting device of FIGS. 23 and 24.

FIG. 25 is an isometric view of components of the mounting device 500 including a pair of arms 202 located on opposite sides of the flexible connector 225. The pivots 205, 206 can connect the arms 202. The flexible connector 225 can extend generally parallel to the arms 202 and a midplane or mid-sagittal plane 308 of the mounting device 500. The motor 235 and a counterbalancing device (not shown in FIGS. 15 and 16), pivots, indexers 211, 212, and other features can be positioned between the arms 202. An optional cover can protect internal components and can be mounted on the arms 202.

Figure 26:
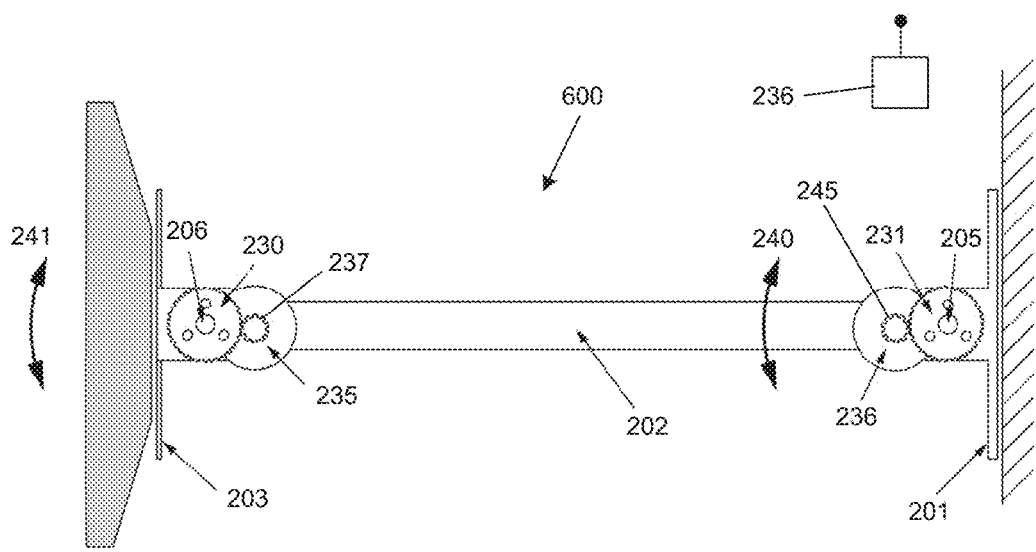
FIG. 26 is a side view of a television mounting system in accordance with embodiments of the technology.

FIG. 26 is a side view of a television mounting device 600 in accordance with embodiments of the technology. The television mounting device 600 can include indexers 230, 231 coupled to the brackets 201, 203, respectively. The indexer 231 can be fixedly connected to the bracket 201, and the arm 202 can be rotatably coupled to the bracket 201 by a pivot 205. A motor 235 can be coupled to an opposing end of the arm 202 and can include a drive gear 245 that enmeshes the gear 231. The indexer 230 can be fixedly connected to the bracket 203, and the bracket 204 can be pivotally coupled to the arm 202 by a pivot 206. The motor 235 can be fixedly coupled to the arm 202 and can include a drive gear 237 that enmeshes the indexer 230. In operation, the motor 239 moves a drive gear 245 to force the arm 202 to rotate about the pivot 205, as indicated by arrows 240. The motor 235 moves a drive gear 237 to force the TV mounting bracket 203 to rotate about the pivot 206, thereby tilting the television as indicated by arrows 241.

Figure 21:
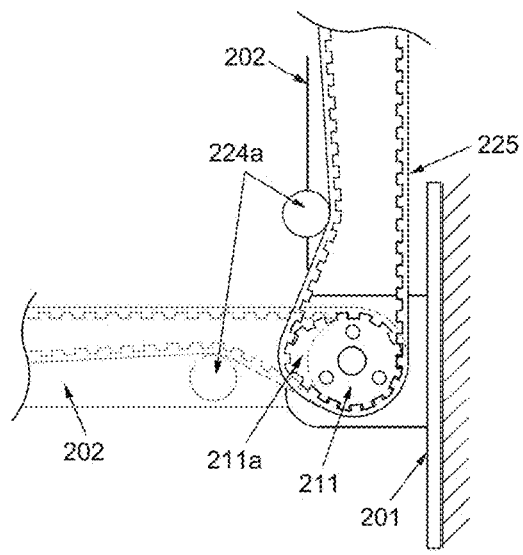
FIG. 21 is a detailed view of a mounting bracket and an end of an arm of the television mounting device of FIG. 20.
Figure 27:
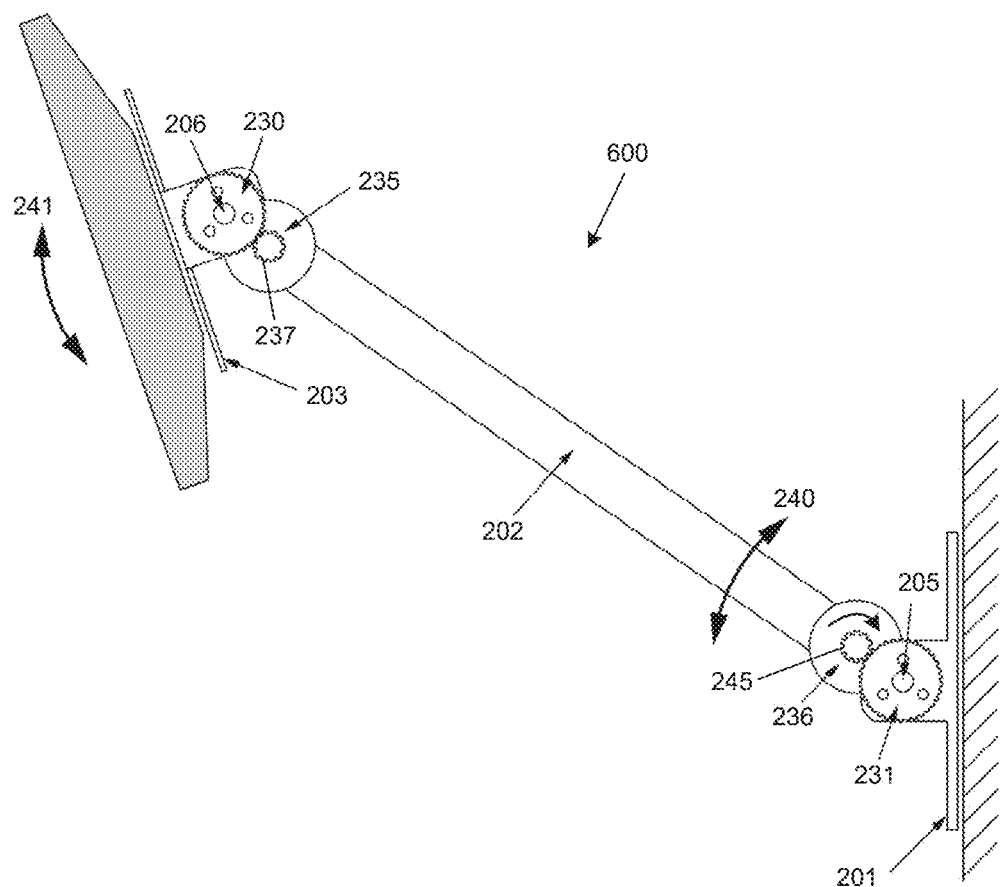
FIG. 27 shows the television mounting system of FIG. 26 in a partially raised position after motors have tilted a top of a television forward and rotated an arm upwardly.

FIGS. 19-21 show the mounting device 600 in different configurations. FIG. 27 shows the mounting device 600 after the motor 239 has rotated the drive gear 245 clockwise. The motor 235 has operated to cause the drive gear 237 to rotate counterclockwise, thereby driving the indexer 230 clockwise. In this manner, the arm 202 has been raised and the display bracket 203 has been tilted downwardly. The mounting device 600 can also include one or more optional motors for moving (e.g., swiveling, tilting, panning, etc.) the display bracket 203. Additional configurations are discussed in connection with FIGS. 20-22.

Figure 28:
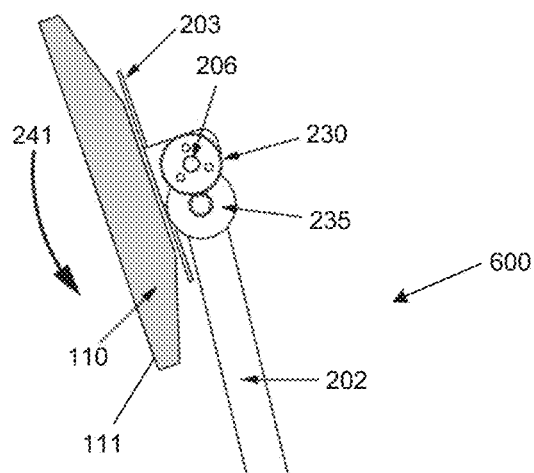
FIG. 28 shows the raised arm angled slightly outward from the wall and a bottom of the television angled downwardly slightly.

FIG. 28 shows the partially raised arm 202 angled outward from the wall while the bottom 111 of the television 110 has been rotated inwardly slightly. The television 110 is tilted downward for better viewing while in the raised position. While the arm 202 remains stationary, the motor 235 can operate to cause rotation of the television mounting bracket 203 about the pivot 206, as indcted by arrows 241.

Figure 29:
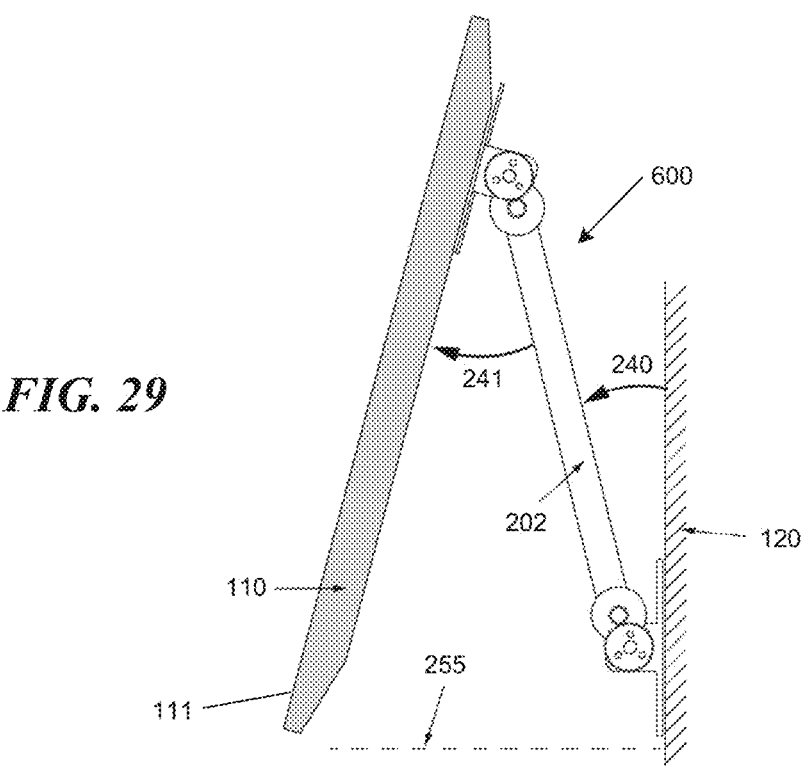
FIG. 29 shows the arm angled outward slightly from the wall and the television angled slightly upwardly.

FIG. 29 shows the arm 202 rotated outward slightly (indicated by arrow 240) from the wall 120 and the bottom of the television 110 also rotated outward slightly (indicated by arrow 241) to keep the bottom 111 of the television 110 at a height, within a range of heights, or above a specific height. For example, the bottom 111 of the television 110 can be kept at or above a height 255 while it moves outward until it clears the mantel. The television 110 can then be rotated to be parallel to the wall in the final lowered position.

Figure 30:
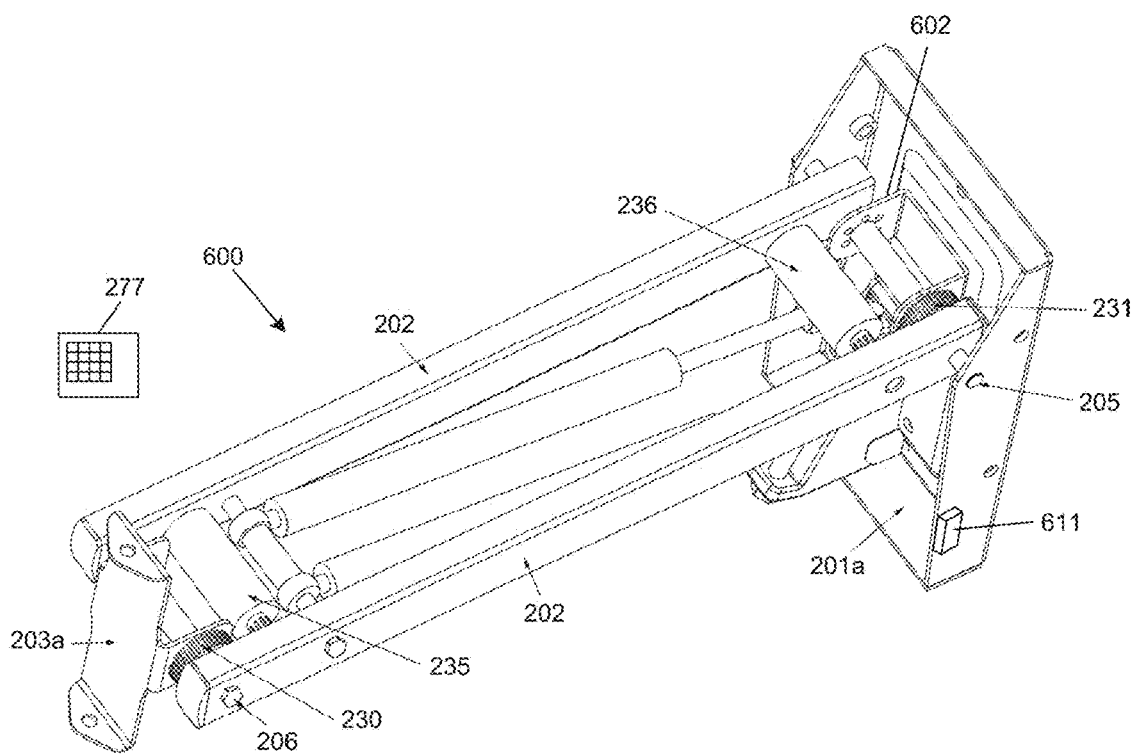
FIG. 30 is an isometric view of a motorized television mounting device with a pair of gas springs and positioning motors.

FIG. 30 is an isometric view of the motorized mount 600 with a pair of gas springs. The motors 235, 236 can be mounted between spaced apart arms 202 and, in some embodiments, a cover can extend over the internal components and the arms 202. The indexer 231 can be adjacent to a U-shaped bracket 602. A pin 205 extends through a mounting or support bracket 201, indexer 231, and U-shaped bracket 602. In some embodiments, one or more sprockets or gears (e.g., spur gears, planetary gears, worm gears, etc.) can be used to transmit forces between the motors 235, 236 and the gears 230, 231, respectively. Rotation of components can be synchronized for desired positioning and can be achieved via wireless communication with a controller 249. For example, the motors 235, 236 can include communication modules and one or more transmitters/receivers, power supplies, and circuitry (e.g., internal controllers) for communicating with a control device 611 and/or a controller 249. Exemplary control devices and controllers are discussed in connection with FIG. 37.

Figure 31:
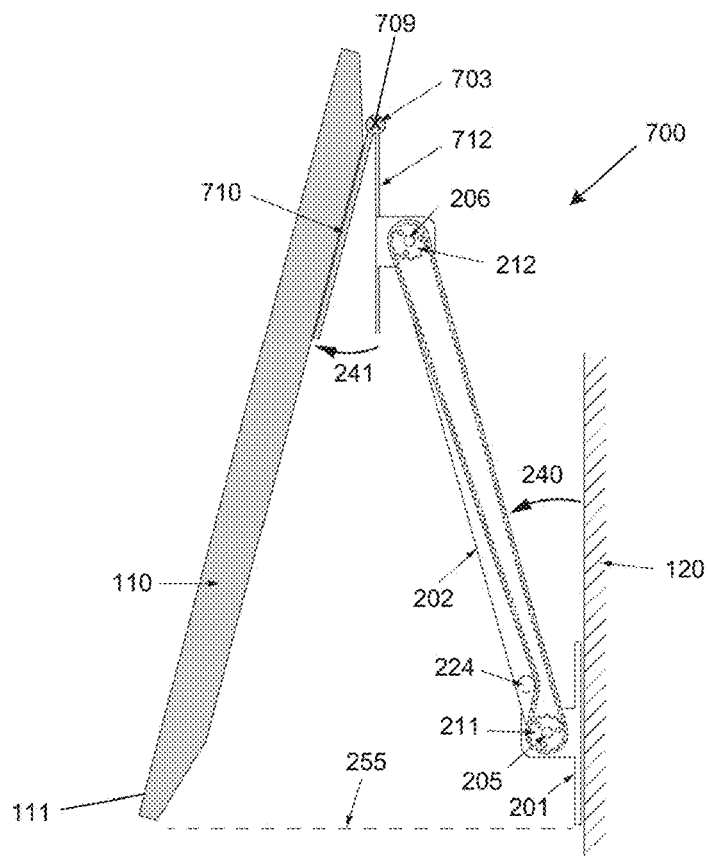
FIG. 31 is a side view of a television mounting device in accordance with embodiments of the technology.

FIG. 31 shows mounting device 700 in accordance with embodiments of the technology. The television 110 may be as tall as the mounting device 700. If the mounting device 700 is mounted above the fireplace close the mantel, the bottom of the television 110 might strike and contact the mantel when the television 110 moves downwardly. To avoid such contact, an optional pivot mechanism 703 can allow the bottom 111 of the television 110 to be swung outwardly away from wall 120. The pivot mechanism 703 can include a TV mounting bracket or front portion 710 and an arm mounting bracket or back portion 712. A substantially horizontal axis of rotation 709 about which the front portion 710 rotates can be generally perpendicular to a mid-sagittal plane (see midsagittal plane 309 of FIG. 25) of the mounting device. In operation, when the arm 202 rotates outwardly away from the wall, as indicated by arrow 240, the television 110 can also rotate outward slightly, as indicated by arrow 241, about the axis 709. In some embodiments, the axis of rotation 709 is generally horizontal and parallel to the wall 120 to allow the bottom 111 of the television 110 to be kept at or above a preselected height 255.

If the mounting device 700 is installed above a mantel, the television 110 can rotate outwardly when the device 700 is lowered so as to keep the television 110 from striking the top of the mantel. After the television 110 clears the mantel, the television 110 can rotate to be parallel to the wall 120 in the final lowered position. In some embodiments, a user can pull the bottom 111 of the television 110 outwardly away from the mantel. In motorized embodiments, the mounting device 700 can include one or more contact sensors, position sensors, motion detectors, and/or other sensors that can provide signals or feedback used to track motion (e.g., user motion, mount motion, etc.), avoid collisions between the TV and surrounding objects, etc. In some embodiments, the pivot mechanism 703 can include one or more plates, hinges, motors, or other components for motorized movement of the television 110. For example, the pivot mechanism 703 can be a hinge. The configuration and operation of the pivot mechanism 703 can be selected based on the desired positioning of the television 110.

Mounting Technology

The television mounting devices disclosed herein can be mounted on different support structures, including the outside of the wall, inside the wall, or other suitable mounting location. For example, the television mounting device of FIGS. 1 and 2 can be mounted to structural elements (e.g., studs, blocking, columns, etc.) within the wall 120 using fasteners, such as screws (e.g., mason screws, wood screws, etc.), bolts, anchors (e.g., sleeve anchors, wedge anchors, etc.), or the like. Mason screws or anchors can be used to mount the mounting device 100 to brick walls. Television mounting devices can also be configured to be partially or completely positioned within support structures as discussed in connection with FIGS. 24-26 and can be oriented to raise/lower televisions, move televisions horizontally, or the like FIG. 32 is a side view of a partially recessed television mounting device 800 in accordance with embodiments of the technology. The television mounting device 800 can include a mounting assembly or bracket 802 ("mounting bracket 802"), a connector assembly 804, and a television bracket 806. The one-piece or multipiece mounting bracket 802 can include one or more housings 810 (e.g., recess boxes, braces, etc.), connectors 812, fasteners, sensors (e.g., position sensors, contact sensors, temperature sensors, water sensors, etc.), conduits (e.g., tubes for wiring), power supplies, or combinations thereof. At least a portion of the connector assembly 804 can be received within an interior space 814 of the mounting bracket 802. The interior space 814 can be defined between an imaginary plane along a front surface 815 of the wall 120 and a back wall 816 of the housing 810. When the television mounting device 800 is moved to the raised position, at least a portion of the connector assembly 804, illustrated as a cantilever arm, can be moved into the interior space 814.

FIGS. 33 and 34 are elevation views of recessed television mounting devices in stowed positions in accordance with embodiments of the technology. Referring now to FIG. 33, a television mounting system 820 can include a mounting assembly or bracket 822 ("mounting bracket 822"), a connector assembly 824, and a television bracket 829. In the first or raised position, the television bracket 829 can be completely received within an interior space 828 of the mounting bracket 822. The mounting bracket 822 can include, without limitation, a housing 826 configured to receive a substantial portion or all of the connector assembly 824. The mounting bracket 822 can include, without limitation, pins, hinges, connectors, or bracket elements. As shown in FIG. 33, all the components of the television mounting system 820 can be positioned rearwardly away from an imaginary vertical plane 830 extending along the front surface of the wall 120.

Referring now to FIG. 34, a television mounting system 840 can include a mounting assembly or bracket 842 ("mounting bracket 842"), a connector assembly 844, and a television bracket 846. The stowed television bracket 846 can be completely received within an interior space 860 of the mounting bracket 842. The mounting system 840 can include auxiliary components 850 positioned within the interior space 860. The auxiliary components 850 can include, without limitation, controllers, wiring, counterbalancing mechanisms (e.g., threaded counterbalancing mechanisms, rack and pinion counterbalancing mechanisms, etc.), biasing devices, linkages, or combinations thereof. In some embodiments, the back of the television 110 can contact and/or lay flush along the wall 120 and cover all or a portion of the opening of a housing 866 of the mounting bracket 842.

The mounting devices 800, 820, and 840 can be installed at other orientations. If the television mounting device 800 is oriented such that FIG. 32 is a top view, the arm 804 can be rotated horizontally for side-to-side movement of the television. The mounting devices 820 and 840 can also be installed for non-vertical movement, including side-to-side or horizontal movement.

The connector assemblies disclosed herein can be arms, linkage assemblies (e.g., two-bar linkages, three-bar linkages, four-bar linkages, five-bar linkages, etc.), swing arms, or the like. The brackets disclosed herein can include spacers, holders, sliders, rails, fasteners, stops, and/or other components that cooperate to facilitate mounting. The sizes, configurations, and functionality of the mounting brackets can be selected to provide a suitable appearance and positioning. For example, mounting brackets hidden within a wall can provide an aesthetically pleasing appearance and remain hidden when the television is in a lower position. A stationary movable plate or covering can extend across the opening or the bracket to keep components of the TV mount system obscured.

Motorized Mounting Systems

Figure 35:
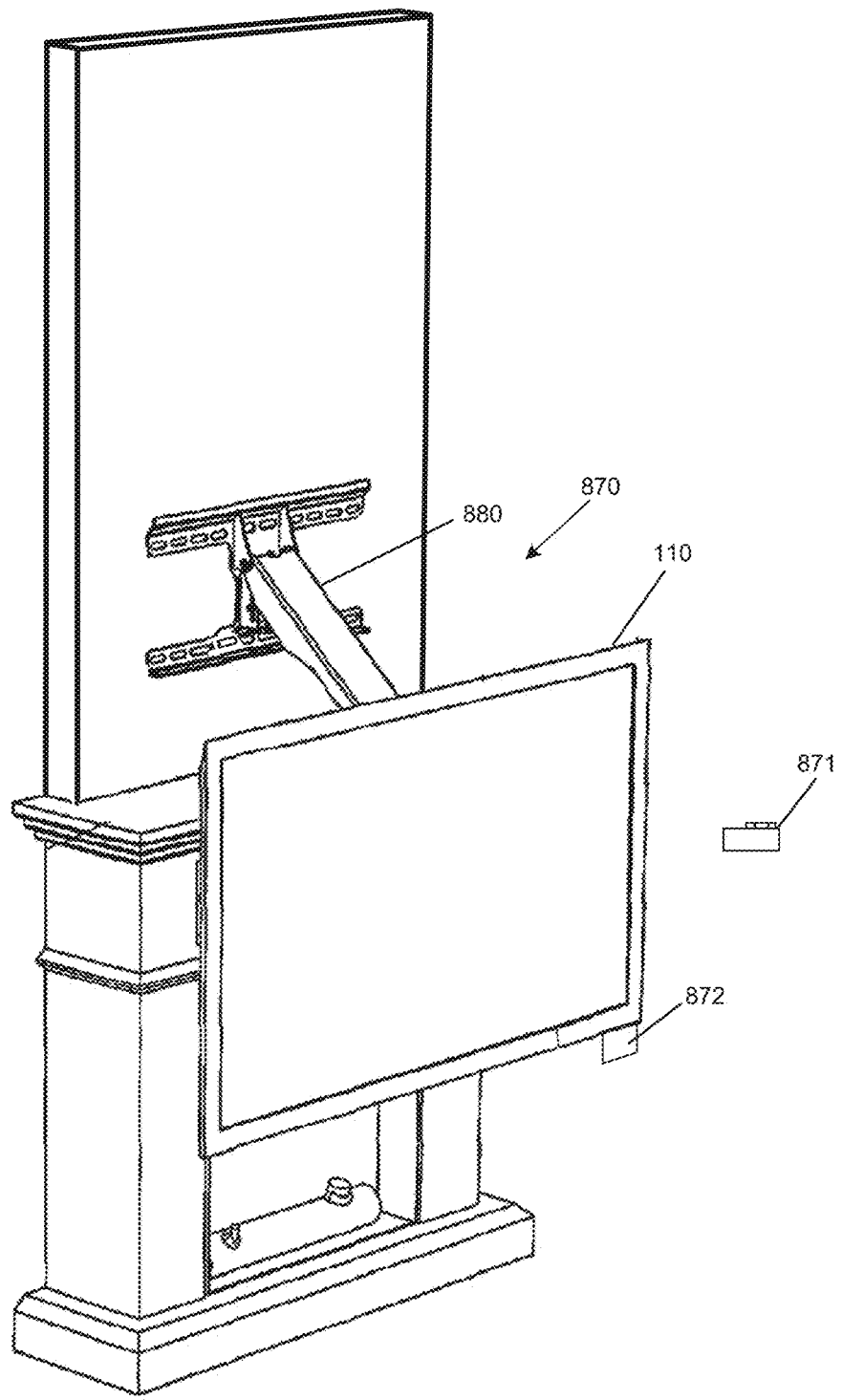
FIG. 35 shows a lowered television held by a motorized mounting system in accordance with an embodiment of the technology.

FIG. 35 illustrates a motorized automated mounting system 870 that can be moved using a controller 871 that communicates with a control device/controller 872. The automated mounting system 870 can be any of the mounts disclosed herein and can include a motorized mounting device 880 that raises and lowers the television 110. The control device 872 can include a receiver that is communicatively coupled (e.g., wirelessly coupled, capacitively coupled, inductively coupled, or the like) to a transmitter of the controller 871. The control device 872 can store information in memory, and the stored information can include, but is not limited to, television position settings (e.g., height, tilt, etc.), the weight of the mounted object, or the like. Settings can include, but are not limited to, television positions (e.g., stowed positions, lowered positions, deployed positions, intermediate positions, or the like), gear settings, rotational relationship settings, schedules, motor settings, motor relationships, kinematic equations, or the like.

The controller 871 can be a wireless controller or remote with artificial intelligence functionality or other suitable functionality. For example, the controller 871 can include or be compatible with hubs or automation devices (e.g., Google Home, Amazon's Alexa, etc.), or other suitable devices for receiving input from users. Voice commands can be used to raise and lower the mounting system, set mounting system positions, program mounting systems, adjust counterbalancing, or the like. In some embodiments, the controller 871 can communicate wirelessly or via a wired connection with another device, such as an IoT hub or digital assistant (e.g., Google Home, Microsoft Cortana, Amazon Alexa, etc.). Wireless communication can be via a local network (e.g., WiFi network) or other suitable network. Additionally or alternatively, the controller 871 and/or control device 872 can communicate with a hub, router, or electronic controller, such as Google Home, Amazon Echo, or the like. In some embodiments, the mounting system 870 can be controlled with one or more voice commands, such as "Siri" (Apple), "Alexa" (Amazon), "Cortana" (Microsoft), Xbox, "OK Google" (Google), and so forth. A button on the controller 871 and/or control device 872 can be used to input/receive voice commands. The control device 872 can have one or more voice detectors (e.g., microphones) that operates to receive voice commands. The controller 871 and/or control device 872 can include one or more communication elements configured to communicate using a mesh network protocol, ZigBee® communication protocol, Z-Wave® communication protocol, wireless local area network, home wireless communication protocols, IoT protocols, or another communication protocol, such as 802.11.

The control device 872 can communicate directly with any number of communication devices and may include one or more sensors for detecting movement, position, temperatures, combinations thereof, or the like. By way of example, the control device 872 can include motion sensors configured to detect motion, such as gestures. Position sensors can be used to detect the position of obstacles. The control device 872 can have proximity sensors for detecting the position of viewers, motion, or the like. Viewer motion and position can be tracked to identify command gestures, positional information (e.g., optimum viewing positions), and so forth. In one embodiment, the control device 872 includes one or more cameras for determining the position of viewers, identifying objects, etc., and the control device 872 can determine the optimal display location using viewing algorithms. Identification software (e.g., facial recognition software) can be used to identify different people and to retrieve appropriate positions. Viewers can have different preferred positions stored in memory. In some embodiments, the control device 872 has an integrated controller, including the controller discussed in connection with FIG. 37.

Microphones can be used to receive audible information. The control device 872 can include a microphone and be programmed to operate in response to the audible input (e.g., voice commands), determine the location of obstacles, and/or avoid striking obstacles (e.g., shelves, pianos, furniture, or other obstacles). Additionally or alternatively, one or more safety sensors can be utilized and can be incorporated into components of the wall mount system. Additionally or alternatively, the control device 872 can be programmed to move the display to various locations based upon, for example, the location of viewers, user-inputted settings, time settings, schedules, or voice commands. A timer can be used to determine when to automatically raise or lower the display. In some embodiments, authentication can be required to move the display. For example, the mounting system 870 can be actuated only when an authorization password or other identifier is provided. This way, children or other individuals cannot move the display.

Operation of the mounting system 870 can be coordinated with media content, including music, television shows, movies, video games, or other suitable media. In one mode of operation, the mounting system 870 can identify the start of the media (e.g., a movie, sports game, etc.) and can automatically position the display at a suitable viewing position. At the end of the content (e.g., completion of the movie, game, etc.), the wall mount 870 can automatically be raised to the stowed position. When one mounting system 870 is moved, it can send data to one or more other mounting systems. The data can include setting information, instructions, commands, or the like.

Mounting systems can be programmed to have coordinated operation. Each control device can have stored instructions and can communicate with each other via wired or wireless connections. In some embodiments, the mounting systems communicate with each other via a local network. Control devices can be programmed to move mounting systems according to one or more cycles or events. In commercial settings, mounting systems can periodically move to attract attention at, for example, a restaurant, a sports bar, or the like.

If the mounting system 870 is mounted above a mantelshelf, the control device 872 can be programmed to ensure that the mounting system does not strike the mantel (e.g., an upper surface of the mantelshelf) as a television is lowered downwardly past the mantelshelf. At a predetermined time (e.g., after a selected bedtime), the mounting system 870 can be automatically moved to the stowed configuration such that children cannot easily reach and pull on the television the next morning. In some embodiments, the mounting system 870 can be automatically returned to the stowed configuration after the television has been turned off for a certain period of time.

The control device 872 can be programmed to move the television to different positions, each having a different indicator (e.g., number, code, etc.). The indicator can be entered using the controller 871. Additionally or alternatively, the control device 872 can include input devices, such as a touch pad, a touch screen, a keyboard, or the like. A user can use the input device to move the mounting system 870 into different positions without utilizing any remote. If the control device 872 is hidden behind a television, the user can reach behind the television to access the control device 872 and position the television as desired. The controller 871 can be a phone (e.g., Smartphone), tablet, computer, or other suitable electronic device for controlling motorized tilt mechanisms, motorized swivels, or other components. The components and features discussed in connection with FIG. 35 can be incorporated into any other mounts or systems disclosed herein.

Figure 36:
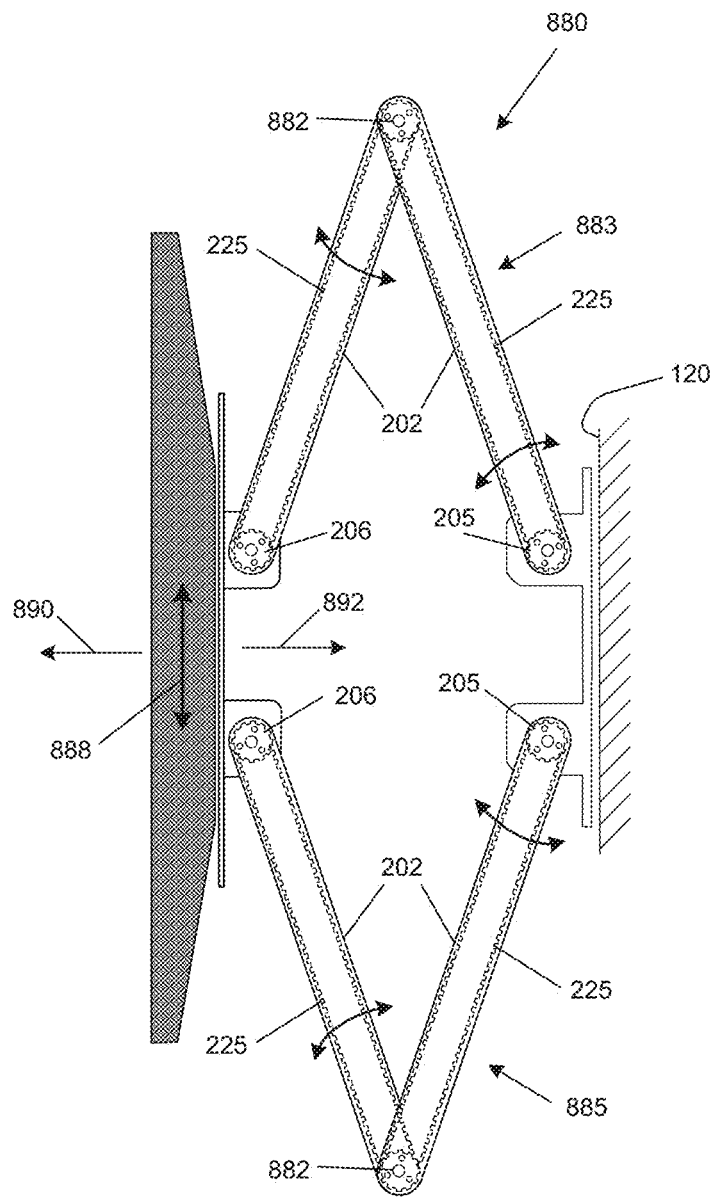
FIG. 36 is a plan view of a motorized mounting system in accordance with an embodiment of the technology.

FIG. 36 is a plan view of a mounting system 880 in accordance with an embodiment of the technology. The mounting system 880 has a pair of arm assemblies 883, 885 each including connected pivoting arms 202. Connectors 225 (e.g., drive belts, tethers, etc.) can connect indexers 205, 882, 206 to coordinate movement between components. One or more motors can be mounted to or incorporated into joints or connections to provide controlled movement. The configuration, components, and functionality of the mounting system 880 can be selected based on the desired movement of the television (e.g., laterally of side-to-side movement 888, forward movement 890, backward movement 892, tilting, swiveling, etc.) A bracket 203 can include one or more swivels, hinges, or other features for rotating the television. In other embodiments, the mounting system 880 can oriented such that FIG. 36 is a side view illustrating vertical movement 888, forward movement 890, backward movement 892, etc. The mounts, assemblies, and components disclosed herein can be mixed and matched to provide desired functionality. The mounting system 880 can include gear assemblies or trains, such as the gear assembly 226 discussed in connection with FIG. 14, carried by the arm assemblies 883, 885.

Controllers

Figure 37:
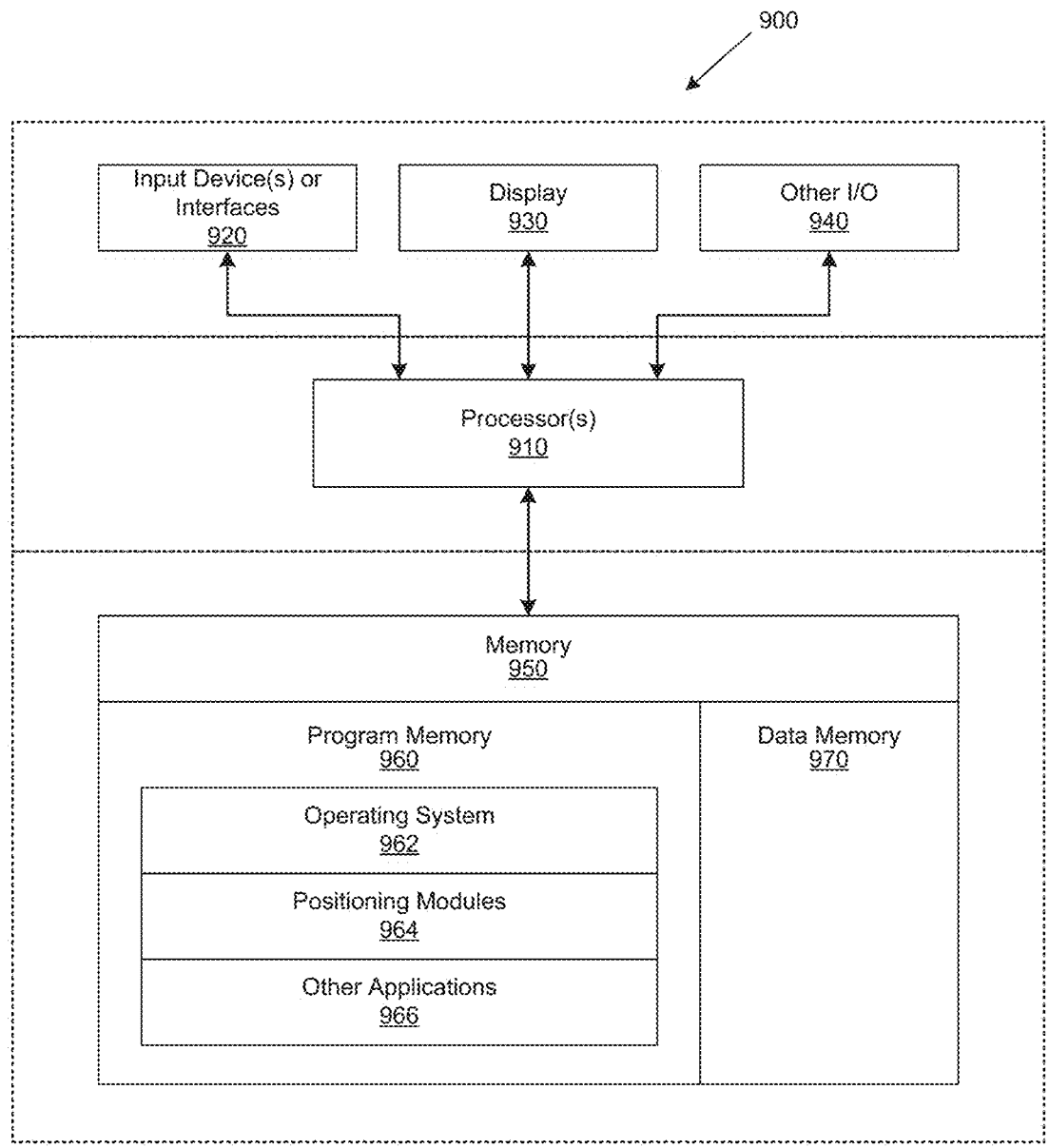
FIG. 37 shows a computing device in accordance with embodiments of the technology.

FIG. 37 illustrates a controller 900 suitable for use in connection with mounts and systems disclosed herein, in accordance with select embodiments of the present technology. The controller 900 can be used to control operation of mounts or can be incorporated in various components of computing devices or mounts, such as control devices (e.g., control device 611 of FIG. 30 or control device 872 of FIG. 35). The controller 900 can include one or more processors 910 (e.g., CPU(s), GPU(s), HPU(s), etc.). The processor(s) 910 can be a single processing unit or multiple processing units in a device or distributed across multiple components. The processor(s) 910 can be coupled to other hardware devices, for example, with the use of a bus, such as a PCI bus or SCSI bus. The processor(s) 910 can be configured to execute one or more computer-readable program instructions, such as program instructions to carry out any of the methods described herein.

The controller 900 can include one or more input device(s) or interface(s) 920 that provide input to the processor(s) 910, e.g., to notify it of actions from a user of the controller 900. The actions can be mediated by a hardware controller that interprets the signals received from the input device and communicates the information to the processor(s) 910 using a communication protocol. Input device(s) or interface(s) 920 can include, for example, buttons, a keypad, a touchscreen, an audio input, voice detector (e.g., microphone), a motion sensor, position sensors, temperature sensor, a keyboard, a touchscreen, an infrared sensor, a port, a camera- or image-based input device, or other user input devices. If controller 900 communicates with a wireless component, the input device(s) or interface(s) 920 can be infrared interfaces, radio remote control interfaces, etc. For example, the controller 900 can be in the form of an infrared wireless remote.

The controller 900 can include a display 930 used to display various types of output, such as television position settings, speed settings, range of motion, time, schedules, routines, network settings (e.g., wired network settings), etc. The processor(s) 910 can communicate with the display 930 via a hardware controller for devices. In some embodiments, the display 930 includes the input device(s) 920 as part of the display 930, such as when the input device 920 includes a touchscreen or is equipped with a motion monitoring system. In alternative embodiments, the display 930 is separate from the input device(s) 920. Examples of display devices include an LCD display screen, an LED display screen, and so on.

Optionally, other I/O devices 940 can also be coupled to the processor(s) 910, such as a network card, video card, audio card, USB, firewire or other external device, speakers, camera, CD-ROM drive, DVD drive, disk drive, or Blu-Ray device. In some embodiments, the I/O devices 940 include one or more HDMI interfaces (HDMI-ARC port, mini-HDMI port, micro-HDMI port, dual-link HDMI port, etc.), optical interfaces, USB, USB-C, component port, S-video port, composite port, coaxial port, or combinations thereof. For example, the other I/O devices 940 can be used to communicate with wired speakers (e.g., Sonos Beam, soundbars, etc.), streaming devices (e.g., streaming sticks, streaming hubs such as Apple TV, 4K streaming devices, etc.), audio receivers, sound systems, or the like. Other I/O devices 940 can further include input ports for receiving data from other sources, such as smartphones, tablets, and/or computers using a network to cast media via a wireless network. In some embodiments, the controller 900 also includes a communication device (not shown) capable of communicating wirelessly or wire-based with a network node. The communication device can communicate with another device or a server through a network using, for example, TCP/IP protocols. The controller 900 can utilize the communication device to distribute operations across multiple network devices, including IoT hubs, IoT bridges, cameras, etc.

The controller 900 can include memory 950, which can be in a single device or distributed across multiple devices. Memory 950 includes one or more of various hardware devices for volatile and non-volatile storage and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. In some embodiments, the memory 950 is a non-transitory computer-readable storage medium that stores, for example, programs, software, data, or the like. In some embodiments, memory 950 can include program memory 960 that stores programs and software, such as an operating system 962, one or more positioning modules 964, and other application programs 966. The positioning modules 964 can include one or more modules configured to perform the various methods described herein (e.g., move mounts, determine television characteristics, select user settings, manage data transfer between components, etc.). Memory 950 can also include data memory 970 that can include, e.g., viewing algorithms, protocols (e.g., communication protocols, network protocols, etc.), configuration data (e.g., load capacities, etc.), libraries (e.g., voice recognition libraries), settings (e.g., manufacturer settings, user settings, trigger settings, event settings, etc.), voice recognition engines, user options or preferences, etc., which can be provided to the program memory 960, positioning coordinates, control maps, or any other element of the controller 900. For example, if the controller 900 is voice-controlled, the data memory 970 can store identification software and/or one or more voice data libraries used to identify voice commands, including wake commands. The controller 900 can be configured to perform voice commands with or without connectivity to a remote server. In some embodiments, the data memory 970 can include machine executable instructions for digital assistants, protocols for communicating with hubs, routers, etc.

The controller discussed herein can control the motors to reconfigure the mounting systems at various configurations. Positional relationships, motor parameters, position matrices, geometric relationships, or the like can be used by the motor to achieve the motion discussed herein. In some modes of operation, a user can input a desired television position. The controller 900 can determine operational parameters for the motors to move the television to the set position. The controller 900 can then command the motors to operate to move the TV along a path, at a desired speed, or the like. If the user wants to change how the TV is moved, the user can use the remote 902 to adjust deployment of the mount. This allows user customization for the position of the television, motion of the television, and the path of travel.

The mounts disclosed herein can include one or more sensors, including temperature elements. A temperature element can be located on the handle to display the ambient temperature. The temperature element can be proximate to the television to warn users if the temperature is too high for the television to safely operate. A means of setting a maximum extension prevents the television from extending beyond a point set by the user. In one embodiment, there is a radial thermometer 71, whereby a dial displays the current ambient temperature near the television to the user. In an alternative embodiment, there is a color changing temperature gauge 72. The color changing temperature gauge comprises a temperature-sensitive material that changes color depending upon the ambient temperature. This enables viewing of the current temperature from a distance. In yet another alternative, the temperature gauge is a digital thermometer with an LCD display. Temperature gauges, handles, and other components that can be incorporated into the systems and mounts disclosed herein are disclosed in U.S. Patent Application Publication No. 20120032062, which is incorporated by reference in its entirety. In some embodiments, the controller 900 is in communication with a temperature element in the form of an electronic temperature sensor. If the temperature sensor detects the temperature at or above a user-set threshold, the controller 900 can cause an alert to be sent to a computing device, such as a user smart phone, tablet, or the like. The communication can be transmitted via a local network or a wide area network. If the user receives an alert, the user can adjust the position of the TV. In automatic setting modes, the controller 900 can be programmed to automatically raise a TV when the temperature sensor measures a selected temperature. This allows the television 110 to be automatically moved to suitable operating positions independent of user operation.

RELATED APPLICATIONS AND PATENTS

Additional apparatuses, components, controllers, software, methods of operation, methods for manufacturing, and other features are disclosed in the following patents and applications: U.S. Patent Application No. 61/396,850; U.S. Pat. Nos. 8,724,037; 9,876,984; 10,257,460; 10,277,860; U.S. Patent Application No. 61/913,195; U.S. Pat. Nos. 9,625,091; 10,281,080; U.S. patent application Ser. No. 16/370,854; U.S. patent application Ser. No. 16/924,551; U.S. patent application Ser. No. 17/026,088; U.S. patent application Ser. No. 16/375,835; U.S. patent application Ser. No. 17/090,701; U.S. Patent Application No. 62/553,961; U.S. Pat. No. 10,738,941; U.S. patent application Ser. No. 16/918,718; U.S. Patent Application No. 62/950,524; U.S. Pat. No. 8,864,092; and U.S. Patent Application No. 62/971, 974. For example, cam mechanisms, tilting features, arms, gas springs, spring blocks, calibration screws, adjustment screws, adjustment collars, panning features, counterbalancing features, controllers, motors, etc., can be incorporated into mounts, arms, support brackets, display brackets, or other components disclosed herein. Additionally, the components and features disclosed herein can be incorporated into four-bar linkages, five-bar linkages, and other mounts or systems disclosed in applications or patents incorporated by reference. The systems and devices can be installed at different positions and orientations to move displays (e.g., monitors, televisions, etc.) to desired positions. In some embodiments, the present invention provides novel improvements over television mounts described in the following patents and patent applications, each is of which is fully incorporated herein by reference: App. No. PCT/US20/66196, U.S. Pat. Nos. 8,864,092; 8,724,037; 9,625,091; 10,281,080; U.S. application Ser. No. 16/033,972; U.S. application Ser. No. 16/375,835; and U.S. App. 62/950,524 ("the incorporated references"). The incorporated references disclose TV mount systems consisting of four primary structural members: a TV bracket, a wall bracket, and two linkage arms. Some improvements described herein comprise only three primary structural members: a TV bracket, a wall bracket, and a single linkage arm. All patents, applications, and other references cited herein are hereby incorporated by reference in their entirety. Any and all priority claims identified in the Application Data Sheet, or any correction thereto, are also hereby incorporated by reference in their entirety.

Some advantages can include that the TV mount system is weighs less and occupies less space than conventional television mounts. At least one embodiment has the additional advantage that the television can be rotated freely from the bottom to clear a mantel, then the TV will swing back to rest at a desired vertical angle for viewing. Both manually operated and motorized embodiments are described herein. Those skilled in the art will recognize that various features of the four-structural-member mounting systems described in the incorporated references can be easily incorporated into the three-structural-member designs described herein. For example, cam mechanisms, tilting features, panning features, counterbalancing features, controllers, motors, sensors, microphones, algorithms, and software disclosed in the incorporated references are compatible with the improved design.

From the foregoing, it will be appreciated that specific embodiments of the invention have been described herein for purposes of illustration, but that various modifications may be made without deviating from the scope of the invention. Accordingly, the invention is not limited except as by the appended claims.

EXAMPLES

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples can be combined in any suitable manner, and placed into a respective independent example. The other examples can be presented in a similar manner.

1. A mounting system comprising:
a television bracket;
a fixed support bracket;
an arm pivotably coupled to the television bracket and the fixed support bracket, wherein the arm pivots relative to the television bracket and the fixed support bracket when the television bracket is moved from a raised position for holding a television above a fireplace to a lowered position for holding at least a portion of the television in front of the fireplace; and
a counterbalance mechanism including:
at least one compression component having a first end coupled to the arm and a second end opposite the first end, and
an adjustment mechanism coupled to the fixed support bracket, the adjustment mechanism having an unlocked state and a locked state and including
a rack; and
a pinion carriage pivotably coupled to the second end of the at least one compression component,
wherein when the adjustment mechanism is in the unlocked state, the carriage is configured to travel along the rack to move the first end to a first position for providing a first counterbalancing force and to a second position for providing a second counterbalancing force different from the first counterbalancing force.

2. The mounting system of example 1 wherein the carriage includes pawl teeth and a pinion assembly positioned to enmesh the pawl teeth to rotationally lock the pinion assembly to the rack when the adjustment mechanism is in the locked state.

3. The mounting system of example 2, wherein when the adjustment mechanism is in the unlocked state, the pinion assembly is configured to disengage the pawl teeth to translate the pinion carriage along the rack.

4. The mounting system of any of examples 2 and 3 wherein the rack includes a surface having teeth positioned to enmesh the pinion assembly to engage the pinion assembly and a track parallel to the surface, and wherein the pinion carriage includes:
a body including the pawl teeth, and
a latching mechanism positioned to mate with the track to hold the pinion assembly against the rack and the pawl teeth against pinion assembly.

5. The mounting system of any of examples 2-4 wherein the at least one pinion gear includes a plurality of pinion gears each rotatably engaging the rack, wherein the at least one pinion gear can be rotated relative to the pinion assembly to translate the carriage along the rack.

6. The mounting system of any of examples 1-5 wherein the pinion carriage is fixedly coupled to the rack when the adjustment mechanism is in the locked state, and wherein the rack is connected to the fixed support bracket.

7. The mounting system of any of examples 1-6 wherein, in the locked state, the adjustment mechanism holds the end of the at least one compression component translationally fixed relative to the fixed support bracket.

8. The mounting system of any of examples 1-7 wherein the at least one compression component includes at least one piston.

9. The mounting system of any of examples 1-8 wherein most of the television bracket in the raised position is located higher than the fixed support bracket when the fixed support bracket is coupled to a vertical wall and the television bracket is at the raised position.

10. The mounting system of any of examples 1-9, further comprising:
an outer pivot coupling an outer end of the arm to the television bracket; and
an inner pivot coupling an inner end of the arm to the fixed support bracket.

11. A system, comprising:
a low-profile wall mount, including:
a display bracket configured to couple to a television;
a support bracket configured to couple to a wall;
an arm assembly having a first end rotatably coupled to the display bracket and a second end rotatably coupled to the support bracket; and
a biasing mechanism configured to counterbalance a weight of the television, the biasing mechanism including a force balancing device and a force adjustment mechanism, wherein the force adjustment mechanism comprises:
a sloped rack having a plurality of teeth; and
a carriage rotatably coupled to the force balancing device and having a pinion assembly positioned to engage the teeth of the sloped rack, wherein the force balancing device rotates relative to the carriage and is capable of extending and contracting when the carriage moves along the sloped rack.

12. The system of example 11 wherein the pinion assembly includes two pinion gears rotatably coupled to the carriage and positioned to engage the teeth of the sloped rack while the carriage rolls along the sloped rack.

13. The system of example 12 wherein the pinion assembly further includes pawl teeth configured to engage the two pinion gears to resist rotation from the to hold the carriage in place along the sloped rack in a fixed state, and wherein the pawl teeth can be disengaged to allow the two pinion gears to rotate in an adjustment state.

14. The system of any of examples 12 and 13 wherein the two pinion gears can be rotated using wrench to move the carriage along the sloped rack.

15. The system of any of examples 11-14 wherein the force adjustment mechanism is movable between a first setting in which the biasing mechanism provides a first balancing force and a second setting in which the biasing mechanism provides a second balancing force that is substantially different from the first balancing force.

16. The system of any of examples 11-15 wherein the force adjustment mechanism moves past a number of the plurality of teeth of the rack between the first setting and the second setting, and wherein a difference between the first balancing force and the second balancing force can be determined based on the number of the plurality teeth of the rack that the carriage moves past.

17. The system of any of examples 11-16 wherein the sloped rack includes a track running parallel to the teeth, and wherein the pinion assembly includes a latching mechanism configured to engage the track to hold the carriage in place along the rack.

18. The system of example 17 wherein the latching mechanism maintains the position of the carriage along the rack when a user applies a counterbalancing force to the display bracket larger than the weight of the television.

19. The system of any of examples 11-18, further comprising a large screen television coupled to the display bracket, the large screen television weighing at least about 30 pounds, the biasing mechanism counterbalancing substantially all of the weight of the large screen television.

20. A mounting system, comprising:
a display bracket for holding a display in a raised position and a lowered position;
a fixed support bracket;
a support arm rotatably coupled to the fixed support bracket; and
a counterbalance mechanism that cooperates with the support arm to allow a user to move the display from the raised position to the lowered position, wherein the counterbalance mechanism includes:
a piston configured to provide a counterbalance force; and
a force adjustment mechanism operable to adjust the counterbalance force, wherein the force adjustment mechanism includes:
a rack with a plurality of teeth, and
a pinion assembly rotatably coupled to the piston such that the piston rotates relative to the pinion assembly and extends and/or contracts as the pinion assembly moves along the rack.

21. The mounting system of example 20 wherein the support arm is moveable between an over-center stowed configuration and a lowered configuration, wherein gravity urges the support arm toward the over-center stowed configuration when the display is in the raised position.

22. The mounting system of any of examples 20 and 21 wherein the carriage includes a pinion assembly configured to engage the rack and translate the carriage along the rack in an incremental manner.

23. The mounting system of any of examples 20-22 wherein each of the pawl teeth on the rack represent an incremental movement for the carriage, and wherein each incremental movement corresponds to an incremental change in the counterbalance force.

24. A television mounting device, comprising:
a mounting bracket configured to mount to a wall;
a television bracket configured to hold a television;
an arm including a first end rotatably coupled to the mounting bracket and a second end rotatably coupled to the television bracket; and
an indexed drive assembly fixedly coupled to the television bracket, wherein the indexed drive assembly rotationally fixes the television bracket to a stationary component of the television mounting device to keep the television at a vertical orientation when the arm is moved from a raised position to a lowered position.

25. The television mounting device of example 24, wherein the indexed drive assembly is configured to cause the television to be positioned below at least a portion of the mounting bracket when the arm is moved to the lowered position.

26. The television mounting device of any of examples 24 and 25, wherein the indexed drive assembly is a rotational lock having a plurality of indexers that cooperate to define a rotational relationship between the television bracket and the stationary component.

27. The television mounting device of any of examples 24-26, wherein the stationary is the mounting bracket, and wherein the indexed drive assembly is configured to maintain an angular positional relationship between the television bracket and the stationary component.

28. The television mounting device of any of examples 24-27, wherein the indexed drive assembly includes a plurality of indexers and a drive belt engaging the indexers.

29. The television mounting device of any of examples 24-28, wherein the indexed drive assembly moves the television bracket to at least one preset position when the arm is moved between the raised position and the lowered position, and wherein the indexed drive assembly includes
- a first indexer connected to the mounting bracket;
- a second indexer connected to the television bracket; and
- a flexible member engaging the first indexer and the second indexer to synchronize (a) rotation of the television bracket relative to the arm and (b) rotation of the arm relative to the mounting bracket.

30. The television mounting device of any of examples 24-29, wherein the indexed drive assembly includes:
- a first motor coupled to the arm and engaging a first gear coupled to the television bracket;
- a second motor engaging a second gear coupled to the mounting bracket; and
- a controller programmed to command the first and second motors to coordinate motion of the arm and motion of the television bracket.

31. The television mounting device of any of examples 24-30, further comprising a non-rotatable connection between the indexed drive assembly and the television bracket, wherein the indexed drive assembly applies a torque to the television bracket to rotate the television bracket in response to rotation of the arm.

32. The television mounting device of any of examples 24-31, wherein the indexed drive assembly includes a plurality of elements with teeth engaging one another.

33. The television mounting device of any of examples 24-32, further comprising a counterbalance assembly that cooperates with the arm to inhibit movement of the television bracket when a user does not apply a force to the television mounting device and to allow the user to apply a force to move the arm relative to the mounting bracket.

34. The television mounting device of any of examples 24-33, wherein the indexed drive assembly includes a belt extending from the mounting bracket to the television bracket, wherein the belt coordinates motion of the arm to rotation of the television bracket relative to the arm.

35. The television mounting device of any of examples 24-34, wherein the indexed drive assembly is rotationally fixed to the television bracket and the mounting bracket and defines a positional relationship between the arm and the television bracket.

36. The television mounting device of any of examples 24-35, wherein the mounting bracket is configured to be embedded in the wall such that at least a portion of the arm moves into the wall when the arm is moved to the raised position.

37. A display mounting device, comprising:
- a mounting bracket;
- a display bracket;
- an arm rotatably coupled to the mounting bracket and rotatably coupled to the display bracket; and
- a drive assembly rotationally fixed to the display bracket, wherein the drive assembly is configured to apply a torque to the display bracket to move the display bracket relative to the arm when the arm moves relative to the mounting bracket.

38. The display mounting device of example 37, wherein the drive assembly is configured to hold the display bracket at a predefined angular relationship with the mounting bracket.

39. The display mounting device of any of examples 37 and 38, further including a non-rotational connection between the drive assembly and the display bracket such that the drive assembly applies the torque directly to the display bracket, wherein the torque is proportional to relative movement between components of the display mounting device.

40. The display mounting device of any of examples 37-39, wherein the display mounting device does not operate as a four-bar linkage.

41. A display mounting device, comprising:
- a mounting bracket;
- a single-pivot display bracket;
- a connector rotatably coupled to the mounting bracket and rotatably coupled to the single-pivot display bracket; and
- a drive assembly operable to cause the single-pivot display bracket to rotate relative to the connector by applying a force to the single-pivot display bracket.

42. The display mounting device of example 41, wherein the connector is a linear arm, a three-bar linkage, or a four-bar linkage, and wherein the drive assembly includes a plurality of indexing elements that cooperate to define movement of the display bracket relative to the connector.

43. The display mounting device of any of examples 41 and 42, wherein the drive assembly has indexers with teeth that cooperate to transmit forces between components for applying the force.

44. A display mounting device, comprising:
- a mounting bracket configured to mount to a wall;
- a display bracket configured to hold a display;
- an arm including a first end pivotally coupled to the mounting bracket and a second end pivotally coupled to the display bracket; and
- a drive assembly rotationally fixed to the display bracket and configured to cause rotation of the display bracket relative to the arm when the arm is moved between a raised position and a lowered position.

45. The display mounting device of example 44, wherein the drive assembly includes a stationary indexer connected to the mounting bracket, the drive assembly holds the display bracket rotationally fixed relative to the stationary indexer such that the movement of the arm relative to the stationary indexer causes the drive assembly to hold the display bracket rotationally fixed with respect to the stationary indexer.

46. The display mounting device of any of examples 44 and 45, wherein a bottom of the display bracket is higher than a bottom of the mounting bracket when the arm is in the raised position and the bottom of the display bracket is lower than the bottom of the mounting bracket when the arm is in the lowered position.

47. The display mounting device of any of examples 44-46, wherein the drive assembly applies a torque to the display bracket to substantially prevent tilting of the display bracket when the display bracket is moved between the raised position and the lowered position, wherein the drive assembly includes
- a first indexer connected to the mounting bracket;
- a second indexer connected to the display bracket; and
- a flexible member engaging the first indexer and the second indexer to synchronize rotation of the display bracket relative to the arm with rotation of the arm relative to the mounting bracket.

48. The display mounting device of any of examples 44-47, wherein the drive assembly connects and rotationally couples the display bracket to the mounting bracket, thereby synchronizing rotation of the arm and the display bracket.

49. The display mounting device of any of examples 44-48, wherein the drive assembly is a pulley system that transfers rotary motion of the arm to the display bracket.

50. The display mounting device of any of examples 44-48, wherein the drive assembly couples the mounting bracket to the display bracket to coordinate rotation of the mounting bracket based on rotation of the arm.

51. The display mounting device of any of examples 44-49, further comprising:
a first motor coupled to the arm and engaging a first gear coupled to the display bracket;
a second motor engaging a second gear coupled to the mounting bracket; and
a controller programmed to command the first and second motors to coordinate motion of the arm and motion of the display bracket.

52. The display mounting device of any of examples 44-51, wherein the drive assembly is fixedly coupled to the display bracket such that the display bracket automatically rotates relative to the arm when the arm moves between the raised position and the lowered position.

53. The display mounting device of any of examples 44-52, wherein the mounting bracket is configured to be installed inside of the wall such that at least a portion of the arm is positioned rearwardly of a front surface of the wall.

54. The display mounting device of any of examples 44-53, wherein the arm is a cantilever arm.

55. The display mounting device of any of examples 44-54, further comprising a counterbalance assembly that cooperates with the arm to inhibit movement of the arm when a user does not apply a force to the display mounting device and to allow the user to apply a force to rotate the arm relative to the mounting bracket to move the display between a deployed position and a stowed position.

56. The display mounting device of any of examples 44-56, wherein the drive assembly includes a first gear fixedly coupled to the display bracket, a second gear fixedly coupled to the mounting bracket, and a plurality of gears engaging one another and the first and second gears.

57. The display mounting device of any of examples 44-57, wherein the display bracket includes a front portion coupled to the display, a back portion coupled to the arm, and a hinge pivotally coupling the front portion to the back portion.

58. The display mounting device of any of examples 44-58, wherein the hinge defines a substantially horizontal axis of rotation about which the front portion rotates, wherein the substantially horizontal axis of rotation is generally perpendicular to a mid-sagittal plane of the display mounting device.

59. The display mounting device of any of examples 44-59, wherein the display bracket is configured to allow a user to pull a bottom of the display mounted to the display bracket away from the arm to angle the display upwardly.

60. The display mounting device of any of examples 44-60, wherein the display mounting device operates as a three-bar linkage.

61. A mounting device, comprising:
a mounting bracket configured to mount to a wall;
a display bracket configured to hold a display;
an elongate member including a first end rotatably coupled to the mounting bracket and a second end rotatably coupled to the display bracket; and
a drive assembly fixedly coupled to the display bracket and configured to rotationally fix the display bracket to at least one stationary component of the display mounting device to keep the display at an orientation when the elongate member is moved relative to the mounting bracket.

62. The mounting device of example 61, wherein the elongate member is moved vertically or horizontally.

63. The mounting device of any of examples 61 and 62, wherein the drive assembly is a rotational lock having a plurality of indexers that cooperate to define a rotational relationship between the display bracket and the at least one stationary component.

We claim:
1. A mounting system comprising:
a television bracket;
a fixed support bracket;
an arm pivotably coupled to the television bracket and the fixed support bracket such that the television bracket is movable from a raised position for holding a television above a fireplace to a lowered position for holding the television in front of the fireplace; and
a counterbalance mechanism including:
at least one compression component having a first end coupled to the arm and a second end opposite the first end, and
an adjustment mechanism coupled to the fixed support bracket, the adjustment mechanism having an unlocked state and a locked state and including
a rack; and
a pinion carriage pivotably coupled to the second end of the at least one compression component, wherein the pinion carriage includes pawl teeth and a pinion assembly positioned to enmesh the pawl teeth to lock the pinion assembly to the rack when the adjustment mechanism is in the locked state, wherein
the rack includes a row of teeth positioned to engage the pinion assembly,
the pinion carriage includes
a body including the pawl teeth, and
a latching mechanism positioned to mate with the rack to hold the pinion assembly against the rack and the pawl teeth against the pinion assembly,
wherein when the adjustment mechanism is in the unlocked state, the pinion carriage is configured to be moved along the rack to move the second end to a first position for providing a first counterbalancing force to a second position for providing a second counterbalancing force different from the first counterbalancing force;
wherein when the adjustment mechanism is in the unlocked state, the pinion assembly is configured to disengage the pawl teeth to allow the pinion carriage to translate along the rack to move the second end of the at least one compression component along the rack.

2. The mounting system of claim 1, wherein the pinion assembly includes at least one pinion gear rotatably engaging the rack, and wherein the at least one pinion gear is configured to rotate relative to the pinion assembly to translate the pinion carriage along the rack.

3. The mounting system of claim 1, wherein the pinion carriage is fixedly coupled to the rack when the adjustment mechanism is in the locked state, and wherein the rack is connected to the fixed support bracket.

4. The mounting system of claim 1, wherein in the locked state, the adjustment mechanism holds the second end of the at least one compression component translationally fixed relative to the fixed support bracket.

5. The mounting system of claim 1, wherein the at least one compression component includes at least one piston.

6. The mounting system of claim 1, wherein the arm is a four-bar linkage or a five-bar linkage, wherein most of the television bracket in the raised position is located higher than the fixed support bracket when the fixed support bracket is coupled to a vertical wall.

7. The mounting system of claim 1, further comprising:
an outer pivot coupling an outer end of the arm to the television bracket; and
an inner pivot coupling an inner end of the arm to the fixed support bracket.

8. A system, comprising:
a wall mount including:
a display bracket configured to couple to a television;
a support bracket configured to couple to a wall;
an arm assembly having a first end rotatably coupled to the display bracket and a second end rotatably coupled to the support bracket;
a force balancing device configured to counterbalance a weight of the television; and
a force adjustment mechanism including:
a rack having a plurality of teeth, and
a carriage rotatably coupled to the force balancing device and releasably couplable to the rack, the carriage having a pinion assembly positioned to engage the teeth of the rack, wherein the force balancing device rotates relative to the carriage and is configured to extend or contract when the carriage moves along the rack, wherein the pinion assembly includes
a body including pawl teeth, and
a latching mechanism configured to mate with the rack to hold the pinion assembly against the rack and the pinion assembly.

9. The system of claim 8, wherein the pinion assembly includes two pinion gears rotatably coupled to a body of the carriage and positioned to engage the plurality of teeth while the carriage moves along the rack.

10. The system of claim 9, wherein the pinion assembly further includes pawl teeth configured to engage the two pinion gears to resist rotation to hold the carriage in place along the rack in a fixed state, and wherein the pawl teeth are configured to disengage the two pinion gears to allow the two pinion gears to rotate in an adjustment state.

11. The system of claim 9, wherein the two pinion gears are rotated using a wrench.

12. The system of claim 8, wherein the force adjustment mechanism is movable between a first setting in which the force balancing device provides a first balancing force and a second setting in which the force balancing device provides a second balancing force that is substantially different from the first balancing force.

13. The system of claim 12, wherein the force adjustment mechanism moves past a number of the plurality of teeth of the rack between the first setting and the second setting, and wherein a difference between the first balancing force and the second balancing force can be determined based on the number of the plurality of teeth of the rack that the carriage moves past.

14. The system of claim 8, wherein the rack includes a track running parallel to the plurality of teeth.

15. The system of claim 14, wherein the latching mechanism maintains the position of the carriage along the rack when the force adjustment mechanism is in a locked state.

16. The system of claim 8, further comprising a large screen television coupled to the display bracket, the large screen television weighing at least about 30 pounds, the force balancing device counterbalancing substantially all of the weight of the large screen television.

17. A display support system, comprising:
a display support assembly including
a display support configured to carry an electronic display,
a stationary support configured to be located along a support surface, and
an arm rotatably coupled to the display support and rotatable relative to the stationary support;
a positioner mechanism rotatably coupled to the display support assembly and including
an extendable device rotatably coupled to the display support assembly and configured to hold the display support assembly in a raised configuration and a lowered configuration,
a gear assembly including a first pinion gear and a second pinion gear, wherein the first and second pinion gears are configured to rotate when an end of the extendable device moves relative to the stationary support, and
a member coupled to the stationary support and the gear assembly such that at least one of the first and second pinion gears is translationally fixed relative to the stationary support to affect movement of the display support while the arm and the end of the extendable device rotate relative to the stationary support.

18. The display support system of claim 17, wherein
the positioner mechanism includes gear teeth, and
the member is a latch configured to hold the gear assembly such that the first and second pinion gears are held against gear teeth positioned between the first and second pinion gears and a bracket of the stationary support facing the surface.

\* \* \* \* \*